United States Patent
Mishra et al.

(10) Patent No.: US 11,223,494 B2
(45) Date of Patent: Jan. 11, 2022

(54) SERVICE INSERTION FOR MULTICAST TRAFFIC AT BOUNDARY

(71) Applicant: VMware, Inc., Palo Alto, CA (US)

(72) Inventors: Rahul Mishra, Mountain View, CA (US); Pierluigi Rolando, Santa Clara, CA (US); Stephen Tan, San Jose, CA (US); Raju Koganty, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 1 day.

(21) Appl. No.: 16/741,544

(22) Filed: Jan. 13, 2020

(65) Prior Publication Data

US 2021/0218587 A1    Jul. 15, 2021

(51) Int. Cl.
*H04L 12/18* (2006.01)
*H04L 12/761* (2013.01)
(Continued)

(52) U.S. Cl.
CPC ........ *H04L 12/185* (2013.01); *H04L 12/1886* (2013.01); *H04L 12/4641* (2013.01); *H04L 45/16* (2013.01); *H04L 61/6022* (2013.01)

(58) Field of Classification Search
None
See application file for complete search history.

(56) References Cited

U.S. PATENT DOCUMENTS 6,006,264 A   12/1999   Colby et al.
6,104,700 A   8/2000    Haddock et al.
(Continued)

FOREIGN PATENT DOCUMENTS

CN   1689369 A      10/2005
CN   101594358 A    12/2009
(Continued)

OTHER PUBLICATIONS

Casado, Martin, et al., "Virtualizing the Network Forwarding Plane," Dec. 2010, 6 pages.

(Continued)

*Primary Examiner* — Edan Orgad
*Assistant Examiner* — Emmanuel K Maglo
(74) *Attorney, Agent, or Firm* — Adeli LLP

(57) ABSTRACT

Some embodiments of the invention provide novel methods for providing transparent services for multicast data messages traversing a network edge device operating at a boundary between two networks. The method analyzes data messages received at the network edge device to determine whether they require a service provided at the boundary and whether they are unicast or multicast (including broadcast). The method modifies a multicast destination media access control (MAC) address of a multicast data message requiring a service to be a unicast destination MAC address and provides, without processing by a standard routing function, the modified data message directly to an interface associated with a service node that provides the particular service required by the data message. The method receives the serviced data message, restores the multicast destination MAC address, and forwards the serviced data message to a set of destinations associated with the multicast destination address.

18 Claims, 5 Drawing Sheets

(51) Int. Cl.
*H04L 29/12* (2006.01)
*H04L 12/46* (2006.01)

(56) References Cited

U.S. PATENT DOCUMENTS

| | | | |
|---|---|---|---|
| 6,154,448 A | 11/2000 | Petersen et al. |
| 6,772,211 B2 | 8/2004 | Lu et al. |
| 6,779,030 B1 | 8/2004 | Dugan et al. |
| 6,826,694 B1 | 11/2004 | Dutta et al. |
| 6,880,089 B1 | 4/2005 | Bommareddy et al. |
| 6,985,956 B2 | 1/2006 | Luke et al. |
| 7,013,389 B1 | 3/2006 | Srivastava et al. |
| 7,209,977 B2 | 4/2007 | Acharya et al. |
| 7,239,639 B2 | 7/2007 | Cox et al. |
| 7,379,465 B2 | 5/2008 | Aysan et al. |
| 7,406,540 B2 | 7/2008 | Acharya et al. |
| 7,447,775 B1 | 11/2008 | Zhu et al. |
| 7,480,737 B2 | 1/2009 | Chauffour et al. |
| 7,487,250 B2 | 2/2009 | Siegel |
| 7,649,890 B2 | 1/2010 | Mizutani et al. |
| 7,698,458 B1 | 4/2010 | Liu et al. |
| 7,818,452 B2 | 10/2010 | Matthews et al. |
| 7,898,959 B1 | 3/2011 | Arad |
| 7,948,986 B1 | 5/2011 | Ghosh et al. |
| 8,078,903 B1 | 12/2011 | Parthasaralhy et al. |
| 8,094,575 B1 | 1/2012 | Vadlakonda et al. |
| 8,175,863 B1 | 5/2012 | Ostermeyer et al. |
| 8,190,767 B1 | 5/2012 | Maufer et al. |
| 8,201,219 B2 | 6/2012 | Jones |
| 8,223,634 B2 | 7/2012 | Tanaka et al. |
| 8,224,885 B1 | 7/2012 | Doucette et al. |
| 8,230,493 B2 | 7/2012 | Davidson et al. |
| 8,266,261 B2 | 9/2012 | Akagi |
| 8,339,959 B1 | 12/2012 | Moisand et al. |
| 8,451,735 B2 | 5/2013 | Li |
| 8,484,348 B2 | 7/2013 | Subramanian et al. |
| 8,488,577 B1 | 7/2013 | Macpherson |
| 8,521,879 B1 | 8/2013 | Pena et al. |
| 8,615,009 B1 | 12/2013 | Ramamoorthi et al. |
| 8,707,383 B2 | 4/2014 | Bade et al. |
| 8,743,885 B2 | 6/2014 | Khan et al. |
| 8,804,720 B1 | 8/2014 | Rainovic et al. |
| 8,804,746 B2 | 8/2014 | Wu et al. |
| 8,811,412 B2 | 8/2014 | Shippy |
| 8,830,834 B2 | 9/2014 | Sharma et al. |
| 8,832,683 B2 | 9/2014 | Heim |
| 8,849,746 B2 | 9/2014 | Candea et al. |
| 8,856,518 B2 | 10/2014 | Sridharan et al. |
| 8,862,883 B2 | 10/2014 | Cherukuri et al. |
| 8,868,711 B2 | 10/2014 | Skjolsvold et al. |
| 8,873,399 B2 | 10/2014 | Bothos et al. |
| 8,874,789 B1 | 10/2014 | Zhu |
| 8,892,706 B1 | 11/2014 | Dalal |
| 8,913,611 B2 | 12/2014 | Koponen et al. |
| 8,914,406 B1 | 12/2014 | Haugsnes et al. |
| 8,966,024 B2 | 2/2015 | Koponen et al. |
| 8,966,029 B2 | 2/2015 | Zhang et al. |
| 8,971,345 B1 | 3/2015 | McCanne et al. |
| 8,989,192 B2 | 3/2015 | Foo et al. |
| 8,996,610 B1 | 3/2015 | Sureshchandra et al. |
| 9,009,289 B1 | 4/2015 | Jacob |
| 9,015,823 B2 | 4/2015 | Koponen et al. |
| 9,094,464 B1 | 7/2015 | Scharber et al. |
| 9,104,497 B2 | 8/2015 | Mortazavi |
| 9,148,367 B2 | 9/2015 | Kandaswamy et al. |
| 9,172,603 B2 | 10/2015 | Padmanabhan et al. |
| 9,178,709 B2 * | 11/2015 | Higashida ........... H04L 12/1836 |
| 9,191,293 B2 | 11/2015 | Iovene et al. |
| 9,195,491 B2 | 11/2015 | Zhang et al. |
| 9,203,748 B2 | 12/2015 | Jiang et al. |
| 9,225,638 B2 | 12/2015 | Jain et al. |
| 9,225,659 B2 | 12/2015 | McCanne et al. |
| 9,232,342 B2 | 1/2016 | Seed et al. |
| 9,258,742 B1 | 2/2016 | Pianigiani et al. |
| 9,264,313 B1 | 2/2016 | Manuguri et al. |
| 9,277,412 B2 | 3/2016 | Freda et al. |
| 9,397,946 B1 | 7/2016 | Yadav |
| 9,407,540 B2 | 8/2016 | Kumar et al. |
| 9,407,599 B2 | 8/2016 | Koponen et al. |
| 9,419,897 B2 | 8/2016 | Cherian et al. |
| 9,479,358 B2 | 10/2016 | Klosowski et al. |
| 9,503,530 B1 | 11/2016 | Niedzielski |
| 9,531,590 B2 | 12/2016 | Jain et al. |
| 9,577,845 B2 | 2/2017 | Thakkar et al. |
| 9,602,380 B2 | 3/2017 | Strassner |
| 9,660,905 B2 | 5/2017 | Dunbar et al. |
| 9,686,192 B2 | 6/2017 | Sengupta et al. |
| 9,686,200 B2 | 6/2017 | Pettit et al. |
| 9,705,702 B2 | 7/2017 | Foo et al. |
| 9,705,775 B2 | 7/2017 | Zhang et al. |
| 9,749,229 B2 | 8/2017 | Previdi et al. |
| 9,755,898 B2 | 9/2017 | Jain et al. |
| 9,755,971 B2 | 9/2017 | Wang et al. |
| 9,774,537 B2 | 9/2017 | Jain et al. |
| 9,787,605 B2 | 10/2017 | Zhang et al. |
| 9,804,797 B1 | 10/2017 | Ng et al. |
| 9,825,810 B2 | 11/2017 | Jain et al. |
| 9,860,079 B2 | 1/2018 | Cohn et al. |
| 9,900,410 B2 | 2/2018 | Dalal |
| 9,935,827 B2 | 4/2018 | Jain et al. |
| 9,979,641 B2 | 5/2018 | Jain et al. |
| 9,985,896 B2 | 5/2018 | Koponen et al. |
| 10,013,276 B2 | 7/2018 | Fahs et al. |
| 10,042,722 B1 | 8/2018 | Chigurupati et al. |
| 10,075,470 B2 | 9/2018 | Vaidya et al. |
| 10,079,779 B2 | 9/2018 | Zhang et al. |
| 10,084,703 B2 | 9/2018 | Kumar et al. |
| 10,089,127 B2 | 10/2018 | Padmanabhan et al. |
| 10,091,276 B2 | 10/2018 | Bloomquist et al. |
| 10,104,169 B1 | 10/2018 | Moniz et al. |
| 10,129,077 B2 | 11/2018 | Jain et al. |
| 10,129,180 B2 | 11/2018 | Zhang et al. |
| 10,135,636 B2 | 11/2018 | Jiang et al. |
| 10,135,737 B2 | 11/2018 | Jain et al. |
| 10,158,573 B1 | 12/2018 | Lee et al. |
| 10,187,306 B2 | 1/2019 | Nainar et al. |
| 10,200,493 B2 | 2/2019 | Bendapudi et al. |
| 10,212,071 B2 | 2/2019 | Kancherla et al. |
| 10,225,137 B2 | 3/2019 | Jain et al. |
| 10,237,379 B2 | 3/2019 | Kumar et al. |
| 10,250,501 B2 | 4/2019 | Ni |
| 10,257,095 B2 | 4/2019 | Jain et al. |
| 10,284,390 B2 | 5/2019 | Kumar et al. |
| 10,320,679 B2 | 6/2019 | Jain et al. |
| 10,333,822 B1 | 6/2019 | Jeuk et al. |
| 10,341,233 B2 | 7/2019 | Jain et al. |
| 10,341,427 B2 | 7/2019 | Jalan et al. |
| 10,375,155 B1 | 8/2019 | Cai et al. |
| 10,397,275 B2 | 8/2019 | Jain et al. |
| 10,514,941 B2 | 12/2019 | Zhang et al. |
| 10,516,568 B2 | 12/2019 | Jain et al. |
| 10,547,692 B2 | 1/2020 | Salgueiro et al. |
| 10,594,743 B2 | 3/2020 | Hong et al. |
| 10,609,091 B2 | 3/2020 | Hong et al. |
| 10,623,309 B1 | 4/2020 | Gampel et al. |
| 10,645,060 B2 | 5/2020 | Ao et al. |
| 10,659,252 B2 | 5/2020 | Boutros et al. |
| 10,693,782 B2 | 6/2020 | Jain et al. |
| 10,708,229 B2 | 7/2020 | Sevinc et al. |
| 10,728,174 B2 | 7/2020 | Boutros et al. |
| 10,742,544 B2 | 8/2020 | Roeland et al. |
| 10,757,077 B2 | 8/2020 | Rajahalme et al. |
| 10,797,910 B2 | 10/2020 | Boutros et al. |
| 10,797,966 B2 | 10/2020 | Boutros et al. |
| 10,805,181 B2 | 10/2020 | Boutros et al. |
| 10,805,192 B2 | 10/2020 | Boutros et al. |
| 10,812,378 B2 | 10/2020 | Nainar et al. |
| 10,853,111 B1 | 12/2020 | Gupta et al. |
| 10,929,171 B2 | 2/2021 | Gokhale et al. |
| 10,938,716 B1 | 3/2021 | Chin et al. |
| 10,944,673 B2 | 3/2021 | Naveen et al. |
| 10,949,244 B2 | 3/2021 | Naveen et al. |
| 11,003,482 B2 | 5/2021 | Rolando et al. |
| 11,012,420 B2 | 5/2021 | Sevinc et al. |

(56) References Cited

U.S. PATENT DOCUMENTS

| | | |
|---|---|---|
| 11,036,538 B2 | 6/2021 | Lecuyer et al. |
| 11,038,782 B2 | 6/2021 | Boutros et al. |
| 11,042,397 B2 | 6/2021 | Mishra et al. |
| 11,075,839 B2 | 7/2021 | Zhuang et al. |
| 2002/0078370 A1 | 6/2002 | Tahan |
| 2002/0097724 A1 | 7/2002 | Halme et al. |
| 2002/0194350 A1 | 12/2002 | Lu et al. |
| 2003/0065711 A1 | 4/2003 | Acharya et al. |
| 2003/0093481 A1 | 5/2003 | Mitchell et al. |
| 2003/0097429 A1 | 5/2003 | Wu et al. |
| 2003/0105812 A1 | 6/2003 | Flowers et al. |
| 2003/0236813 A1 | 12/2003 | Abjanic |
| 2004/0066769 A1 | 4/2004 | Ahmavaara et al. |
| 2004/0210670 A1 | 10/2004 | Anerousis et al. |
| 2004/0215703 A1 | 10/2004 | Song et al. |
| 2005/0021713 A1 | 1/2005 | Dugan et al. |
| 2005/0089327 A1 | 4/2005 | Ovadia et al. |
| 2005/0091396 A1 | 4/2005 | Nilakantan et al. |
| 2005/0114429 A1 | 5/2005 | Caccavale |
| 2005/0114648 A1 | 5/2005 | Akundi et al. |
| 2005/0132030 A1 | 6/2005 | Hopen et al. |
| 2005/0198200 A1 | 9/2005 | Subramanian et al. |
| 2005/0249199 A1 | 11/2005 | Albert et al. |
| 2006/0069776 A1 | 3/2006 | Shim et al. |
| 2006/0112297 A1 | 5/2006 | Davidson |
| 2006/0130133 A1 | 6/2006 | Andreev et al. |
| 2006/0155862 A1 | 7/2006 | Kathi et al. |
| 2006/0195896 A1 | 8/2006 | Fulp et al. |
| 2006/0233155 A1 | 10/2006 | Srivastava |
| 2007/0061492 A1 | 3/2007 | Riel |
| 2007/0121615 A1 | 5/2007 | Weill et al. |
| 2007/0214282 A1 | 9/2007 | Sen |
| 2007/0248091 A1 | 10/2007 | Khalid et al. |
| 2007/0260750 A1 | 11/2007 | Feied et al. |
| 2007/0288615 A1 | 12/2007 | Keohane et al. |
| 2007/0291773 A1 | 12/2007 | Khan et al. |
| 2008/0005293 A1 | 1/2008 | Bhargava et al. |
| 2008/0031263 A1 | 2/2008 | Ervin et al. |
| 2008/0046400 A1 | 2/2008 | Shi et al. |
| 2008/0049614 A1 | 2/2008 | Briscoe et al. |
| 2008/0049619 A1 | 2/2008 | Twiss |
| 2008/0049786 A1 | 2/2008 | Ram et al. |
| 2008/0072305 A1 | 3/2008 | Casado et al. |
| 2008/0084819 A1 | 4/2008 | Parizhsky et al. |
| 2008/0095153 A1 | 4/2008 | Fukunaga et al. |
| 2008/0104608 A1 | 5/2008 | Hyser et al. |
| 2008/0195755 A1 | 8/2008 | Lu et al. |
| 2008/0225714 A1 | 9/2008 | Denis |
| 2008/0239991 A1 | 10/2008 | Applegate et al. |
| 2008/0247396 A1 | 10/2008 | Hazard |
| 2008/0276085 A1 | 11/2008 | Davidson et al. |
| 2008/0279196 A1 | 11/2008 | Friskney et al. |
| 2009/0003349 A1 | 1/2009 | Havemann et al. |
| 2009/0003364 A1 | 1/2009 | Fendick et al. |
| 2009/0003375 A1 | 1/2009 | Havemann et al. |
| 2009/0019135 A1 | 1/2009 | Eswaran et al. |
| 2009/0037713 A1 | 2/2009 | Khalid et al. |
| 2009/0063706 A1 | 3/2009 | Goldman et al. |
| 2009/0129271 A1 | 5/2009 | Ramankutty et al. |
| 2009/0172666 A1 | 7/2009 | Yahalom et al. |
| 2009/0199268 A1 | 8/2009 | Ahmavaara et al. |
| 2009/0235325 A1 | 9/2009 | Dimitrakos et al. |
| 2009/0238084 A1 | 9/2009 | Nadeau et al. |
| 2009/0249472 A1 | 10/2009 | Litvin et al. |
| 2009/0265467 A1 | 10/2009 | Peles et al. |
| 2009/0271586 A1 | 10/2009 | Shaath |
| 2009/0299791 A1 | 12/2009 | Blake et al. |
| 2009/0300210 A1 | 12/2009 | Ferris |
| 2009/0303880 A1 | 12/2009 | Maltz et al. |
| 2009/0307334 A1 | 12/2009 | Maltz et al. |
| 2009/0327464 A1 | 12/2009 | Archer et al. |
| 2010/0031360 A1 | 2/2010 | Seshadri et al. |
| 2010/0036903 A1 | 2/2010 | Ahmad et al. |
| 2010/0100616 A1 | 4/2010 | Bryson et al. |
| 2010/0131638 A1 | 5/2010 | Kondamuru |
| 2010/0165985 A1 | 7/2010 | Sharma et al. |
| 2010/0223364 A1 | 9/2010 | Wei |
| 2010/0223621 A1 | 9/2010 | Joshi et al. |
| 2010/0235915 A1 | 9/2010 | Memon et al. |
| 2010/0265824 A1 | 10/2010 | Chao et al. |
| 2010/0281482 A1 | 11/2010 | Pike et al. |
| 2010/0332595 A1 | 12/2010 | Fullagar et al. |
| 2011/0010578 A1 | 1/2011 | Dominguez et al. |
| 2011/0016348 A1 | 1/2011 | Pace et al. |
| 2011/0022695 A1 | 1/2011 | Dalal et al. |
| 2011/0022812 A1 | 1/2011 | Van Der Linden et al. |
| 2011/0035494 A1 | 2/2011 | Pandey et al. |
| 2011/0040893 A1 | 2/2011 | Karaoguz et al. |
| 2011/0055845 A1 | 3/2011 | Nandagopal et al. |
| 2011/0058563 A1 | 3/2011 | Saraph et al. |
| 2011/0090912 A1 | 4/2011 | Shippy |
| 2011/0164504 A1 | 7/2011 | Bothos et al. |
| 2011/0194563 A1 | 8/2011 | Shen et al. |
| 2011/0211463 A1 | 9/2011 | Matityahu et al. |
| 2011/0225293 A1 | 9/2011 | Rathod |
| 2011/0235508 A1 | 9/2011 | Goel et al. |
| 2011/0261811 A1 | 10/2011 | Battestilli et al. |
| 2011/0268118 A1 | 11/2011 | Schlansker et al. |
| 2011/0271007 A1 | 11/2011 | Wang et al. |
| 2011/0276695 A1 | 11/2011 | Maldaner |
| 2011/0283013 A1 | 11/2011 | Grosser et al. |
| 2011/0295991 A1 | 12/2011 | Aida |
| 2011/0317708 A1 | 12/2011 | Clark |
| 2012/0005265 A1 | 1/2012 | Ushioda et al. |
| 2012/0014386 A1 | 1/2012 | Xiong et al. |
| 2012/0023231 A1 | 1/2012 | Ueno |
| 2012/0054266 A1 | 3/2012 | Kazerani et al. |
| 2012/0089664 A1 | 4/2012 | Igelka |
| 2012/0137004 A1 | 5/2012 | Smith |
| 2012/0140719 A1 | 6/2012 | Hui et al. |
| 2012/0144014 A1 | 6/2012 | Natham et al. |
| 2012/0147894 A1 | 6/2012 | Mulligan et al. |
| 2012/0155266 A1 | 6/2012 | Patel et al. |
| 2012/0176932 A1 | 7/2012 | Wu et al. |
| 2012/0185588 A1 | 7/2012 | Error |
| 2012/0195196 A1 | 8/2012 | Ghai et al. |
| 2012/0207174 A1 | 8/2012 | Shieh |
| 2012/0213074 A1 | 8/2012 | Goldfarb et al. |
| 2012/0230187 A1 | 9/2012 | Tremblay et al. |
| 2012/0239804 A1 | 9/2012 | Liu et al. |
| 2012/0246637 A1 | 9/2012 | Kreeger et al. |
| 2012/0281540 A1 | 11/2012 | Khan et al. |
| 2012/0287789 A1 | 11/2012 | Aybay et al. |
| 2012/0303784 A1 | 11/2012 | Zisapel et al. |
| 2012/0303809 A1 | 11/2012 | Patel et al. |
| 2012/0311568 A1 | 12/2012 | Jansen |
| 2012/0317260 A1 | 12/2012 | Husain et al. |
| 2012/0317570 A1 | 12/2012 | Dalcher et al. |
| 2012/0331188 A1 | 12/2012 | Riordan et al. |
| 2013/0003735 A1 | 1/2013 | Chao et al. |
| 2013/0021942 A1* | 1/2013 | Bacthu ............... H04L 12/4641 370/254 |
| 2013/0031544 A1 | 1/2013 | Sridharan et al. |
| 2013/0039218 A1 | 2/2013 | Narasimhan et al. |
| 2013/0044636 A1 | 2/2013 | Koponen et al. |
| 2013/0058346 A1 | 3/2013 | Sridharan et al. |
| 2013/0073743 A1 | 3/2013 | Ramasamy et al. |
| 2013/0100851 A1* | 4/2013 | Bacthu ............... H04L 12/4641 370/254 |
| 2013/0125120 A1 | 5/2013 | Zhang et al. |
| 2013/0136126 A1 | 5/2013 | Wang et al. |
| 2013/0142048 A1 | 6/2013 | Gross, IV et al. |
| 2013/0148505 A1 | 6/2013 | Koponen et al. |
| 2013/0151661 A1 | 6/2013 | Koponen et al. |
| 2013/0159487 A1 | 6/2013 | Patel et al. |
| 2013/0160024 A1 | 6/2013 | Shtilman et al. |
| 2013/0163594 A1 | 6/2013 | Sharma et al. |
| 2013/0166703 A1 | 6/2013 | Hammer et al. |
| 2013/0170501 A1 | 7/2013 | Egi et al. |
| 2013/0201989 A1 | 8/2013 | Hu et al. |
| 2013/0227097 A1 | 8/2013 | Yasuda et al. |
| 2013/0227550 A1 | 8/2013 | Weinstein et al. |
| 2013/0287026 A1 | 10/2013 | Davie |

(56) References Cited

U.S. PATENT DOCUMENTS

| | | | |
|---|---|---|---|
| 2013/0291088 A1* | 10/2013 | Shieh | H04L 63/0218 726/11 |
| 2013/0297798 A1 | 11/2013 | Arisoylu et al. | |
| 2013/0311637 A1 | 11/2013 | Kamath et al. | |
| 2013/0318219 A1 | 11/2013 | Kancherla | |
| 2013/0332983 A1 | 12/2013 | Koorevaar et al. | |
| 2013/0336319 A1* | 12/2013 | Liu | H04L 12/18 370/390 |
| 2013/0343174 A1 | 12/2013 | Guichard et al. | |
| 2013/0343378 A1 | 12/2013 | Veteikis et al. | |
| 2014/0003232 A1 | 1/2014 | Guichard et al. | |
| 2014/0003422 A1 | 1/2014 | Mogul et al. | |
| 2014/0010085 A1 | 1/2014 | Kavunder et al. | |
| 2014/0029447 A1 | 1/2014 | Schrum, Jr. | |
| 2014/0046997 A1 | 2/2014 | Dain et al. | |
| 2014/0046998 A1 | 2/2014 | Dain et al. | |
| 2014/0052844 A1 | 2/2014 | Nayak et al. | |
| 2014/0059204 A1 | 2/2014 | Nguyen et al. | |
| 2014/0059544 A1 | 2/2014 | Koganty et al. | |
| 2014/0068602 A1 | 3/2014 | Gember et al. | |
| 2014/0092738 A1 | 4/2014 | Grandhi et al. | |
| 2014/0092906 A1 | 4/2014 | Kandaswamy et al. | |
| 2014/0092914 A1 | 4/2014 | Kondapalli | |
| 2014/0096183 A1 | 4/2014 | Jain et al. | |
| 2014/0101226 A1 | 4/2014 | Khandekar et al. | |
| 2014/0101656 A1 | 4/2014 | Zhu et al. | |
| 2014/0115578 A1 | 4/2014 | Cooper et al. | |
| 2014/0129715 A1 | 5/2014 | Mortazavi | |
| 2014/0149696 A1 | 5/2014 | Frenkel et al. | |
| 2014/0164477 A1 | 6/2014 | Springer et al. | |
| 2014/0169168 A1 | 6/2014 | Jalan et al. | |
| 2014/0169375 A1 | 6/2014 | Khan et al. | |
| 2014/0195666 A1 | 7/2014 | Dumitriu et al. | |
| 2014/0207968 A1 | 7/2014 | Kumar et al. | |
| 2014/0254374 A1 | 9/2014 | Janakiraman et al. | |
| 2014/0254591 A1* | 9/2014 | Mahadevan | H04L 45/54 370/390 |
| 2014/0269487 A1* | 9/2014 | Kalkunte | H04L 47/32 370/312 |
| 2014/0269717 A1* | 9/2014 | Thubert | H04L 63/1458 370/392 |
| 2014/0269724 A1 | 9/2014 | Mehler et al. | |
| 2014/0281029 A1 | 9/2014 | Danforth | |
| 2014/0282526 A1 | 9/2014 | Basavaiah et al. | |
| 2014/0301388 A1 | 10/2014 | Jagadish et al. | |
| 2014/0304231 A1 | 10/2014 | Kamath et al. | |
| 2014/0307744 A1 | 10/2014 | Dunbar et al. | |
| 2014/0310391 A1 | 10/2014 | Sorenson et al. | |
| 2014/0310418 A1 | 10/2014 | Sorenson et al. | |
| 2014/0317677 A1 | 10/2014 | Vaidya et al. | |
| 2014/0321459 A1 | 10/2014 | Kumar et al. | |
| 2014/0330983 A1 | 11/2014 | Zisapel et al. | |
| 2014/0334485 A1 | 11/2014 | Jain et al. | |
| 2014/0334488 A1 | 11/2014 | Guichard et al. | |
| 2014/0351452 A1 | 11/2014 | Bosch et al. | |
| 2014/0362682 A1 | 12/2014 | Guichard et al. | |
| 2014/0362705 A1 | 12/2014 | Pan | |
| 2014/0369204 A1 | 12/2014 | Anand et al. | |
| 2014/0372567 A1 | 12/2014 | Ganesh et al. | |
| 2014/0372616 A1 | 12/2014 | Arisoylu et al. | |
| 2014/0372702 A1 | 12/2014 | Subramanyam et al. | |
| 2015/0003453 A1 | 1/2015 | Sengupta et al. | |
| 2015/0003455 A1 | 1/2015 | Haddad et al. | |
| 2015/0009995 A1 | 1/2015 | Gross, IV et al. | |
| 2015/0016279 A1 | 1/2015 | Zhang et al. | |
| 2015/0023354 A1 | 1/2015 | Li et al. | |
| 2015/0026345 A1 | 1/2015 | Ravinoothala et al. | |
| 2015/0026362 A1 | 1/2015 | Guichard et al. | |
| 2015/0030024 A1 | 1/2015 | Venkataswami et al. | |
| 2015/0052262 A1 | 2/2015 | Chanda et al. | |
| 2015/0052522 A1 | 2/2015 | Chanda et al. | |
| 2015/0063102 A1 | 3/2015 | Mestery et al. | |
| 2015/0063364 A1 | 3/2015 | Thakkar et al. | |
| 2015/0071301 A1 | 3/2015 | Dalal | |
| 2015/0073967 A1* | 3/2015 | Katsuyama | G06Q 30/08 705/37 |
| 2015/0078384 A1 | 3/2015 | Jackson et al. | |
| 2015/0092564 A1 | 4/2015 | Aldrin | |
| 2015/0103645 A1 | 4/2015 | Shen et al. | |
| 2015/0103679 A1 | 4/2015 | Tessmer et al. | |
| 2015/0103827 A1 | 4/2015 | Quinn et al. | |
| 2015/0109901 A1 | 4/2015 | Tan et al. | |
| 2015/0124608 A1 | 5/2015 | Agarwal et al. | |
| 2015/0124622 A1 | 5/2015 | Kovvali et al. | |
| 2015/0124840 A1 | 5/2015 | Bergeron | |
| 2015/0138973 A1 | 5/2015 | Kumar et al. | |
| 2015/0139041 A1 | 5/2015 | Bosch et al. | |
| 2015/0146539 A1 | 5/2015 | Mehta et al. | |
| 2015/0156035 A1 | 6/2015 | Foo et al. | |
| 2015/0188770 A1 | 7/2015 | Naiksatam et al. | |
| 2015/0195197 A1 | 7/2015 | Yong et al. | |
| 2015/0213087 A1 | 7/2015 | Sikri | |
| 2015/0215819 A1 | 7/2015 | Bosch et al. | |
| 2015/0222640 A1 | 8/2015 | Kumar et al. | |
| 2015/0236948 A1 | 8/2015 | Dunbar et al. | |
| 2015/0237013 A1 | 8/2015 | Bansal et al. | |
| 2015/0242197 A1 | 8/2015 | Alfonso et al. | |
| 2015/0263901 A1 | 9/2015 | Kumar et al. | |
| 2015/0263946 A1 | 9/2015 | Tubaltsev et al. | |
| 2015/0271102 A1 | 9/2015 | Antich | |
| 2015/0280959 A1 | 10/2015 | Vincent | |
| 2015/0281089 A1 | 10/2015 | Marchetti | |
| 2015/0281098 A1 | 10/2015 | Pettit et al. | |
| 2015/0281125 A1 | 10/2015 | Koponen et al. | |
| 2015/0281179 A1 | 10/2015 | Raman et al. | |
| 2015/0281180 A1 | 10/2015 | Raman et al. | |
| 2015/0288671 A1 | 10/2015 | Chan et al. | |
| 2015/0288679 A1 | 10/2015 | Ben-Nun et al. | |
| 2015/0295831 A1 | 10/2015 | Kumar et al. | |
| 2015/0365322 A1 | 12/2015 | Shatzkamer et al. | |
| 2015/0370596 A1 | 12/2015 | Fahs et al. | |
| 2015/0372840 A1 | 12/2015 | Benny et al. | |
| 2015/0372911 A1 | 12/2015 | Yabusaki et al. | |
| 2015/0381493 A1* | 12/2015 | Bansal | H04L 45/745 370/392 |
| 2015/0381494 A1 | 12/2015 | Cherian et al. | |
| 2015/0381495 A1 | 12/2015 | Cherian et al. | |
| 2016/0006654 A1 | 1/2016 | Fernando et al. | |
| 2016/0028640 A1 | 1/2016 | Zhang et al. | |
| 2016/0043901 A1 | 2/2016 | Sankar et al. | |
| 2016/0057050 A1 | 2/2016 | Ostrom et al. | |
| 2016/0057687 A1 | 2/2016 | Horn et al. | |
| 2016/0065503 A1 | 3/2016 | Yohe et al. | |
| 2016/0080253 A1 | 3/2016 | Wang et al. | |
| 2016/0087888 A1 | 3/2016 | Jain et al. | |
| 2016/0094384 A1 | 3/2016 | Jain et al. | |
| 2016/0094389 A1 | 3/2016 | Jain et al. | |
| 2016/0094451 A1 | 3/2016 | Jain et al. | |
| 2016/0094452 A1 | 3/2016 | Jain et al. | |
| 2016/0094453 A1 | 3/2016 | Jain et al. | |
| 2016/0094454 A1 | 3/2016 | Jain et al. | |
| 2016/0094455 A1 | 3/2016 | Jain et al. | |
| 2016/0094456 A1 | 3/2016 | Jain et al. | |
| 2016/0094457 A1 | 3/2016 | Jain et al. | |
| 2016/0094631 A1 | 3/2016 | Jain et al. | |
| 2016/0094632 A1 | 3/2016 | Jain et al. | |
| 2016/0094633 A1 | 3/2016 | Jain et al. | |
| 2016/0094642 A1 | 3/2016 | Jain et al. | |
| 2016/0094643 A1 | 3/2016 | Jain et al. | |
| 2016/0094661 A1 | 3/2016 | Jain et al. | |
| 2016/0105333 A1 | 4/2016 | Lenglet et al. | |
| 2016/0119226 A1 | 4/2016 | Guichard et al. | |
| 2016/0127306 A1* | 5/2016 | Wang | H04L 61/1541 370/390 |
| 2016/0127564 A1 | 5/2016 | Sharma et al. | |
| 2016/0134528 A1 | 5/2016 | Lin et al. | |
| 2016/0149816 A1 | 5/2016 | Roach et al. | |
| 2016/0164776 A1 | 6/2016 | Biancaniello | |
| 2016/0164787 A1 | 6/2016 | Roach et al. | |
| 2016/0164826 A1 | 6/2016 | Riedel et al. | |
| 2016/0173373 A1 | 6/2016 | Guichard et al. | |
| 2016/0182684 A1 | 6/2016 | Connor et al. | |
| 2016/0197839 A1 | 7/2016 | Li et al. | |

(56) References Cited

U.S. PATENT DOCUMENTS

| | | |
|---|---|---|
| 2016/0205015 A1 | 7/2016 | Halligan et al. |
| 2016/0212048 A1 | 7/2016 | Kaempfer et al. |
| 2016/0226700 A1 | 8/2016 | Zhang et al. |
| 2016/0226754 A1 | 8/2016 | Zhang et al. |
| 2016/0226762 A1 | 8/2016 | Zhang et al. |
| 2016/0248685 A1 | 8/2016 | Pignataro et al. |
| 2016/0277210 A1 | 9/2016 | Lin et al. |
| 2016/0277294 A1 | 9/2016 | Akiyoshi |
| 2016/0294612 A1 | 10/2016 | Ravinoothala et al. |
| 2016/0294933 A1 | 10/2016 | Hong et al. |
| 2016/0294935 A1 | 10/2016 | Hong et al. |
| 2016/0308758 A1 | 10/2016 | Li et al. |
| 2016/0308961 A1 | 10/2016 | Rao |
| 2016/0337189 A1 | 11/2016 | Liebhart et al. |
| 2016/0337249 A1 | 11/2016 | Zhang et al. |
| 2016/0344565 A1 | 11/2016 | Batz et al. |
| 2016/0344621 A1 | 11/2016 | Roeland et al. |
| 2016/0352866 A1 | 12/2016 | Gupta et al. |
| 2016/0366046 A1 | 12/2016 | Anantharam et al. |
| 2016/0373364 A1 | 12/2016 | Yokota |
| 2016/0378537 A1 | 12/2016 | Zou |
| 2017/0005920 A1 | 1/2017 | Previdi et al. |
| 2017/0005923 A1 | 1/2017 | Babakian |
| 2017/0005988 A1 | 1/2017 | Bansal et al. |
| 2017/0019329 A1 | 1/2017 | Kozat et al. |
| 2017/0026417 A1 | 1/2017 | Ermagan et al. |
| 2017/0033939 A1 | 2/2017 | Bragg et al. |
| 2017/0063683 A1 | 3/2017 | Li et al. |
| 2017/0063928 A1 | 3/2017 | Jain et al. |
| 2017/0064048 A1 | 3/2017 | Pettit et al. |
| 2017/0064749 A1 | 3/2017 | Jain et al. |
| 2017/0078176 A1 | 3/2017 | Lakshmikantha et al. |
| 2017/0078961 A1* | 3/2017 | Rabii ............... H04W 52/0258 |
| 2017/0093698 A1 | 3/2017 | Farmanbar |
| 2017/0126497 A1 | 5/2017 | Dubey et al. |
| 2017/0126522 A1 | 5/2017 | McCann et al. |
| 2017/0134538 A1 | 5/2017 | Mahkonen et al. |
| 2017/0142012 A1 | 5/2017 | Thakkar et al. |
| 2017/0147399 A1 | 5/2017 | Cropper et al. |
| 2017/0149582 A1 | 5/2017 | Cohn et al. |
| 2017/0149675 A1 | 5/2017 | Yang |
| 2017/0149680 A1* | 5/2017 | Liu ..................... H04L 47/6215 |
| 2017/0163531 A1 | 6/2017 | Kumar et al. |
| 2017/0163724 A1 | 6/2017 | Puri et al. |
| 2017/0195255 A1 | 7/2017 | Pham et al. |
| 2017/0208000 A1 | 7/2017 | Bosch et al. |
| 2017/0208011 A1 | 7/2017 | Bosch et al. |
| 2017/0208532 A1 | 7/2017 | Zhou |
| 2017/0214627 A1 | 7/2017 | Zhang et al. |
| 2017/0230333 A1 | 8/2017 | Glazemakers et al. |
| 2017/0230467 A1 | 8/2017 | Salgueiro et al. |
| 2017/0237656 A1 | 8/2017 | Gage |
| 2017/0250902 A1 | 8/2017 | Rasanen et al. |
| 2017/0250917 A1 | 8/2017 | Ruckstuhl et al. |
| 2017/0257432 A1 | 9/2017 | Fu et al. |
| 2017/0264677 A1 | 9/2017 | Li |
| 2017/0273099 A1 | 9/2017 | Zhang et al. |
| 2017/0279938 A1 | 9/2017 | You et al. |
| 2017/0295021 A1 | 10/2017 | Gutiérrez et al. |
| 2017/0295100 A1 | 10/2017 | Hira et al. |
| 2017/0310588 A1 | 10/2017 | Zuo |
| 2017/0310611 A1 | 10/2017 | Kumar et al. |
| 2017/0317887 A1 | 11/2017 | Dwaraki et al. |
| 2017/0317926 A1 | 11/2017 | Penno et al. |
| 2017/0317954 A1 | 11/2017 | Masurekar et al. |
| 2017/0318097 A1 | 11/2017 | Drew et al. |
| 2017/0324651 A1 | 11/2017 | Penno et al. |
| 2017/0331672 A1 | 11/2017 | Fedyk et al. |
| 2017/0339110 A1 | 11/2017 | Ni |
| 2017/0339600 A1 | 11/2017 | Roeland et al. |
| 2017/0346764 A1 | 11/2017 | Tan et al. |
| 2017/0353387 A1 | 12/2017 | Kwak et al. |
| 2017/0364794 A1 | 12/2017 | Mahkonen et al. |
| 2017/0373990 A1 | 12/2017 | Jeuk et al. |
| 2018/0027101 A1 | 1/2018 | Kumar et al. |
| 2018/0041524 A1 | 2/2018 | Reddy et al. |
| 2018/0063018 A1 | 3/2018 | Bosch et al. |
| 2018/0091420 A1 | 3/2018 | Drake et al. |
| 2018/0102919 A1 | 4/2018 | Hao et al. |
| 2018/0102965 A1* | 4/2018 | Hari ..................... H04L 45/74 |
| 2018/0115471 A1 | 4/2018 | Curcio et al. |
| 2018/0123950 A1 | 5/2018 | Garg et al. |
| 2018/0124061 A1 | 5/2018 | Raman et al. |
| 2018/0139098 A1 | 5/2018 | Sunavala et al. |
| 2018/0145899 A1 | 5/2018 | Rao |
| 2018/0159733 A1 | 6/2018 | Poon et al. |
| 2018/0159801 A1 | 6/2018 | Rajan et al. |
| 2018/0159943 A1 | 6/2018 | Poon et al. |
| 2018/0176177 A1 | 6/2018 | Bichot et al. |
| 2018/0176294 A1 | 6/2018 | Vacaro et al. |
| 2018/0183764 A1 | 6/2018 | Gunda |
| 2018/0184281 A1 | 6/2018 | Tamagawa et al. |
| 2018/0191600 A1* | 7/2018 | Hecker .................. H04L 41/12 |
| 2018/0198692 A1 | 7/2018 | Ansari et al. |
| 2018/0198705 A1 | 7/2018 | Wang et al. |
| 2018/0198791 A1 | 7/2018 | Desai et al. |
| 2018/0205637 A1 | 7/2018 | Li |
| 2018/0213040 A1 | 7/2018 | Pak et al. |
| 2018/0219762 A1 | 8/2018 | Wang et al. |
| 2018/0227216 A1 | 8/2018 | Hughes |
| 2018/0234360 A1 | 8/2018 | Narayana et al. |
| 2018/0248713 A1 | 8/2018 | Zanier et al. |
| 2018/0248755 A1 | 8/2018 | Hecker et al. |
| 2018/0248986 A1 | 8/2018 | Dalal |
| 2018/0262427 A1 | 9/2018 | Jain et al. |
| 2018/0262434 A1 | 9/2018 | Koponen et al. |
| 2018/0278530 A1 | 9/2018 | Connor et al. |
| 2018/0295053 A1 | 10/2018 | Leung et al. |
| 2018/0302242 A1 | 10/2018 | Hao et al. |
| 2018/0337849 A1 | 11/2018 | Sharma et al. |
| 2018/0349212 A1 | 12/2018 | Liu et al. |
| 2018/0351874 A1 | 12/2018 | Abhigyan et al. |
| 2019/0020580 A1 | 1/2019 | Boutros et al. |
| 2019/0020600 A1 | 1/2019 | Zhang et al. |
| 2019/0020684 A1 | 1/2019 | Qian et al. |
| 2019/0028384 A1 | 1/2019 | Penno et al. |
| 2019/0036819 A1 | 1/2019 | Kancherla et al. |
| 2019/0068500 A1 | 2/2019 | Hira |
| 2019/0089679 A1 | 3/2019 | Kahalon et al. |
| 2019/0097838 A1 | 3/2019 | Sahoo et al. |
| 2019/0124096 A1 | 4/2019 | Ahuja et al. |
| 2019/0132220 A1* | 5/2019 | Boutros ............. H04L 47/2483 |
| 2019/0132221 A1 | 5/2019 | Boutros et al. |
| 2019/0140947 A1 | 5/2019 | Zhuang et al. |
| 2019/0140950 A1 | 5/2019 | Zhuang et al. |
| 2019/0149512 A1 | 5/2019 | Sevinc et al. |
| 2019/0149516 A1 | 5/2019 | Rajahalme et al. |
| 2019/0149518 A1 | 5/2019 | Sevinc et al. |
| 2019/0166045 A1 | 5/2019 | Peng et al. |
| 2019/0173778 A1 | 6/2019 | Faseela et al. |
| 2019/0173850 A1 | 6/2019 | Jain et al. |
| 2019/0173851 A1 | 6/2019 | Jain et al. |
| 2019/0229937 A1 | 7/2019 | Nagarajan et al. |
| 2019/0230126 A1 | 7/2019 | Kumar et al. |
| 2019/0238363 A1 | 8/2019 | Boutros et al. |
| 2019/0238364 A1 | 8/2019 | Boutros et al. |
| 2019/0288947 A1 | 9/2019 | Jain et al. |
| 2019/0306036 A1 | 10/2019 | Boutros et al. |
| 2019/0306086 A1 | 10/2019 | Boutros et al. |
| 2019/0342175 A1 | 11/2019 | Wan et al. |
| 2019/0379578 A1 | 12/2019 | Mishra et al. |
| 2019/0379579 A1 | 12/2019 | Mishra et al. |
| 2020/0007388 A1 | 1/2020 | Johnston et al. |
| 2020/0036629 A1 | 1/2020 | Roeland et al. |
| 2020/0059761 A1* | 2/2020 | Li ......................... H04M 15/765 |
| 2020/0067828 A1 | 2/2020 | Liu et al. |
| 2020/0076684 A1 | 3/2020 | Naveen et al. |
| 2020/0076734 A1 | 3/2020 | Naveen et al. |
| 2020/0084141 A1 | 3/2020 | Bengough et al. |
| 2020/0136960 A1 | 4/2020 | Jeuk et al. |
| 2020/0145331 A1 | 5/2020 | Bhandari et al. |
| 2020/0162318 A1 | 5/2020 | Patil et al. |
| 2020/0204492 A1 | 6/2020 | Sarva et al. |
| 2020/0213366 A1 | 7/2020 | Hong et al. |

(56) References Cited

U.S. PATENT DOCUMENTS

| | | | |
|---|---|---|---|
| 2020/0220805 A1 | 7/2020 | Dhanabalan | |
| 2020/0272493 A1 | 8/2020 | Lecuyer et al. | |
| 2020/0272494 A1 | 8/2020 | Gokhale et al. | |
| 2020/0272495 A1 | 8/2020 | Rolando et al. | |
| 2020/0272496 A1 | 8/2020 | Mundaragi et al. | |
| 2020/0272497 A1 | 8/2020 | Kavathia et al. | |
| 2020/0272498 A1 | 8/2020 | Mishra et al. | |
| 2020/0272499 A1 | 8/2020 | Feng et al. | |
| 2020/0272500 A1 | 8/2020 | Feng et al. | |
| 2020/0272501 A1 | 8/2020 | Chalvadi et al. | |
| 2020/0274757 A1 | 8/2020 | Rolando et al. | |
| 2020/0274769 A1 | 8/2020 | Naveen et al. | |
| 2020/0274778 A1 | 8/2020 | Lecuyer et al. | |
| 2020/0274779 A1 | 8/2020 | Rolando et al. | |
| 2020/0274795 A1 | 8/2020 | Rolando et al. | |
| 2020/0274808 A1 | 8/2020 | Mundaragi et al. | |
| 2020/0274809 A1 | 8/2020 | Rolando et al. | |
| 2020/0274810 A1 | 8/2020 | Gokhale et al. | |
| 2020/0274826 A1 | 8/2020 | Mishra et al. | |
| 2020/0274944 A1 | 8/2020 | Naveen et al. | |
| 2020/0274945 A1 | 8/2020 | Rolando et al. | |
| 2020/0322271 A1 | 10/2020 | Jain et al. | |
| 2020/0344088 A1* | 10/2020 | Selvaraj | H04L 45/04 |
| 2020/0358696 A1 | 11/2020 | Hu et al. | |
| 2020/0366526 A1 | 11/2020 | Boutros et al. | |
| 2020/0366584 A1 | 11/2020 | Boutros et al. | |
| 2020/0382412 A1* | 12/2020 | Chandrappa | H04L 45/64 |
| 2020/0382420 A1 | 12/2020 | Suryanarayana et al. | |
| 2021/0029088 A1 | 1/2021 | Mayya et al. | |
| 2021/0044502 A1 | 2/2021 | Boutros et al. | |
| 2021/0120080 A1 | 4/2021 | Mishra et al. | |
| 2021/0135992 A1 | 5/2021 | Tidemann et al. | |
| 2021/0136140 A1 | 5/2021 | Tidemann et al. | |
| 2021/0136141 A1 | 5/2021 | Tidemann et al. | |

FOREIGN PATENT DOCUMENTS

| | | | |
|---|---|---|---|
| CN | 101729412 | A | 6/2010 |
| CN | 103516807 | A | 1/2014 |
| CN | 103795805 | A | 5/2014 |
| EP | 2426956 | A1 | 3/2012 |
| EP | 2466985 | A1 | 6/2012 |
| EP | 3210345 | A1 | 8/2017 |
| EP | 3300319 | A1 | 3/2018 |
| JP | 2005311863 | A | 11/2005 |
| WO | 9918534 | A2 | 4/1999 |
| WO | 2008095010 | A1 | 8/2008 |
| WO | 2014069978 | A1 | 5/2014 |
| WO | 2014182529 | A1 | 11/2014 |
| WO | 2016053373 | A1 | 4/2016 |
| WO | 2016054272 | A1 | 4/2016 |
| WO | 2019084066 | A1 | 5/2019 |
| WO | 2019147316 | A1 | 8/2019 |
| WO | 2020046686 | A1 | 3/2020 |
| WO | 2020171937 | A1 | 8/2020 |
| WO | 2021086462 | A1 | 5/2021 |

OTHER PUBLICATIONS

Karakus, Murat, et al., "Quality of Service (QoS) in Software Defined Networking (SDN): A Survey," Journal of Network and Computer Applications, Dec. 9, 2016, 19 pages, vol. 80, Elsevier, Ltd.
Non-Published Commonly Owned U.S. Appl. No. 16/905,909, filed Jun. 18, 2020, 36 pages, Nicira, Inc.
Non-Published Commonly Owned U.S. Appl. No. 16/945,675, filed Jul. 31, 2020, 51 pages, Nicira, Inc.
Non-Published Commonly Owned U.S. Appl. No. 16/945,868, filed Aug. 1, 2020, 48 pages, Nicira, Inc.
Non-Published Commonly Owned U.S. Appl. No. 17/067,635, filed Oct. 9, 2020, 65 pages, Nicira, Inc.
Siasi, N., et al., "Container-Based Service Function Chain Mapping," 2019 SoutheastCon, Apr. 11-14, 2019, 6 pages, IEEE, Huntsville, AL, USA.
Author Unknown, "Datagram," Jun. 22, 2012, 2 pages, retrieved from https://web.archive.org/web/20120622031055/https://en.wikipedia.org/wiki/datagram.
Author Unknown, "AppLogic Features," Jul. 2007, 2 pages. 3TERA, Inc.
Author Unknown, "Enabling Service Chaining on Cisco Nexus 1000V Series," Month Unknown, 2012, 25 pages, CISCO.
Dixon, Colin, et al., "An End to the Middle," Proceedings of the 12th Conference on Hot Topics in Operating Systems, May 2009, 5 pages, USENIX Association, Berkeley, CA, USA.
Dumitriu, Dan Mihai, et al., (U.S. Appl. No. 61/514,990), filed Aug. 4, 2011, 31 pages.
Greenberg, Albert, et al., "VL2: A Scalable and Flexible Data Center Network," SIGCOMM '09, Aug. 17-21, 2009, 12 pages, ACM, Barcelona, Spain.
Guichard, J., et al., "Network Service Chaining Problem Statement," Network Working Group, Jun. 13, 2013, 14 pages, Cisco Systems, Inc.
Halpern, J., et al., "Service Function Chaining (SFC) Architecture," draft-ietf-sfc-architecture-02, Sep. 20, 2014, 26 pages, IETF.
Joseph, Dilip Anthony, et al., "A Policy-aware Switching Layer for Data Centers," Jun. 24, 2008, 26 pages, Electrical Engineering and Computer Sciences, University of California, Berkeley, CA, USA.
Kumar, S., et al., "Service Function Chaining Use Cases in Data Centers," draft-ietf-sfc-dc-use-cases-01, Jul. 21, 2014, 23 pages, IETF.
Liu, W., et al., "Service Function Chaining (SFC) Use Cases," draft-liu-sfc-use-cases-02, Feb. 13, 2014, 17 pages, IETF.
Non-Published Commonly Owned U.S. Appl. No. 16/444,826, filed Jun. 18, 2019, 125 pages, VMware, Inc.
Non-Published Commonly Owned U.S. Appl. No. 16/444,845, filed Jun. 18, 2019, 124 pages, VMware, Inc.
Non-Published Commonly Owned U.S. Appl. No. 16/444,884, filed Jun. 18, 2019, 98 pages, VMware, Inc.
Non-Published Commonly Owned U.S. Appl. No. 16/444,907, filed Jun. 18, 2019, 98 pages, VMware, Inc.
Non-Published Commonly Owned U.S. Appl. No. 16/444,927, filed Jun. 18, 2019, 99 pages, VMware, Inc.
Non-Published Commonly Owned U.S. Appl. No. 16/444,935, filed Jun. 18, 2019, 98 pages, VMware, Inc.
Non-Published Commonly Owned U.S. Appl. No. 16/444,956, filed Jun. 18, 2019, 98 pages, VMware, Inc.
Non-Published Commonly Owned U.S. Appl. No. 16/444,964, filed Jun. 18, 2019, 98 pages, VMware, Inc.
Non-Published Commonly Owned U.S. Appl. No. 16/444,978, filed Jun. 18, 2019, 98 pages, VMware, Inc.
Non-Published Commonly Owned U.S. Appl. No. 16/444,989, filed Jun. 18, 2019, 98 pages, VMware, Inc.
Non-Published Commonly Owned U.S. Appl. No. 16/445,004, filed Jun. 18, 2019, 98 pages, VMware, Inc.
Non-Published Commonly Owned U.S. Appl. No. 16/445,016, filed Jun. 18, 2019, 99 pages, VMware, Inc.
Mon-Published Commonly Owned U.S. Appl. No. 16/445,023, filed Jun. 18, 2019, 99 pages, VMware, Inc.
Non-Published Commonly Owned U.S. Appl. No. 16/445,031, filed Jun. 18, 2019, 99 pages, VMware, Inc.
Non-Published Commonly Owned U.S. Appl. No. 16/445,035, filed Jun. 18, 2019, 98 pages, VMware, Inc.
Non-Published Commonly Owned U.S. Appl. No. 16/445,044, filed Jun. 18, 2019, 98 pages, VMware, Inc.
Non-Published Commonly Owned U.S. Appl. No. 16/445,051, filed Jun. 18, 2019, 99 pages, VMware, Inc.
Non-Published Commonly Owned U.S. Appl. No. 16/445,058, filed Jun. 18, 2019, 99 pages, VMware, Inc.
Non-Published Commonly Owned U.S. Appl. No. 16/445,062, filed Jun. 18, 2019, 98 pages, VMware, Inc.
Non-Published Commonly Owned U.S. Appl. No. 16/445,064, filed Jun. 18, 2019, 99 pages, VMware, Inc.
Non-Published Commonly Owned U.S. Appl. No. 16/668,477, filed Oct. 30, 2019, 31 pages, VMware, Inc.

(56) References Cited

OTHER PUBLICATIONS

Non-Published Commonly Owned U.S. Appl. No. 16/668,485, filed Oct. 30, 2019, 55 pages, VMware, Inc.
Non-Published Commonly Owned U.S. Appl. No. 16/668,505, filed Oct. 30, 2019, 39 pages, VMware, Inc.
Non-Published Commonly Owned U.S. Appl. No. 16/816,067, filed Mar. 11, 2020, 55 pages, Nicira, Inc.
Salsano, Stefano, et al., "Generalized Virtual Networking: An Enabler for Service Centric Networking and Network Function Virtualization," 2014 16th International Telecommunications Network Strategy and Planning Symposium, Sep. 17-19, 2014, 7 pages, IEEE, Funchal, Portugal.
Sekar, Vyas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.
Sherry, Justine, et al., "Making Middleboxes Someone Else's Problem: Network Processing as a Cloud Service," in Proc. of SIGCOMM '12, Aug. 13-17, 2012, 12 pages, Helsinki, Finland.
Lin, Po-Ching, et al., "Balanced Service Chaining in Software-Defined Networks with Network Function Virtualization," Computer: Research Feature, Nov. 2016, 9 pages, vol. 49, No. 11, IEEE.
Non-Published Commonly Owned U.S. Appl. No. 17/346,255, filed Jun. 13, 2021, 49 pages, Nicira, Inc.
Non-Published Commonly Owned U.S. Appl. No. 17/352,298, filed Jun. 19, 2021, 132 pages, VMware, Inc.
Xiong, Gang, et al., "A Mechanism for Configurable Network Service Chaining and Its Implementation," KSII Transactions on Internet and Information Systems, Aug. 2016, 27 pages, vol. 10, No. 8, KSII.

\* cited by examiner

SERVICE INSERTION FOR MULTICAST TRAFFIC AT BOUNDARY

BACKGROUND

Currently systems for providing transparent services for multicast data messages at a network edge device prematurely forward the multicast data messages to the plurality of destinations of the multicast data message. Accordingly, a solution that provides a transparent service at a network edge device before forwarding the multicast data message to the plurality of destinations is required.

BRIEF SUMMARY

Some embodiments of the invention provide novel methods for providing a set of transparent services for multicast data messages traversing a network edge forwarding element (e.g., a forwarding element executing on an NSX edge) operating at a boundary between two networks (e.g., an external site and a local site operating the network edge device). The method analyzes data messages received at the network edge device to determine whether they require a service provided at the boundary and whether they are unicast or multicast (including broadcast). For data messages that are determined to be multicast data messages that require a particular service, the method modifies a multicast destination media access control (MAC) address of the data message to be a unicast destination MAC address and provides, without processing by a standard routing function, the modified data message directly to an interface associated with a service node that provides the particular service required by the data message. The method receives the serviced data message and modifies the destination MAC address to be the original multicast destination MAC address and provides the data message to the standard routing function to forward the serviced data message to a set of destinations associated with the multicast destination address.

By avoiding the routing function when providing the data message to the service node, the method ensures that the data message is not sent, before the service is provide, by the standard routing function to the destinations associated with the destination multicast internet protocol (IP) address. Furthermore, by changing only the destination MAC address while maintaining the destination multicast IP address throughout the data message processing, the method is able to generate the original destination multicast MAC address using known techniques (i.e., using the last 23 bits of the multicast IP address as the last 23 bits of a multicast MAC address where the first 25 bits of the multicast MAC address are a prefix that identifies the MAC address as a multicast MAC address).

Identifying that the data message is a multicast data message requiring a particular service, in some embodiments, includes using policy-based routing rules that each specify a set of data message attributes (e.g., an n-tuple, or an n-tuple and a VLAN tag, etc.) and a set of actions (e.g., modifying the data message, or identifying a next hop for the data message) for data messages with attributes that match the specified set of data message attributes. In some embodiments, an action specifies a universally unique identifier (UUID) of a service node for a required service. The UUID, for a first set of services, identifies a service node cluster with a specific service provide node further identified with a separate UUID or a network or link layer address identifying a particular service node associated with the cluster's UUID. For a second set of services, the UUID identifies a particular service node directly. A set of UUIDs identifying particular service nodes may also be specified in the policy-based routing rule with one of the UUIDs being selected at random or based on a load balancing operation to provide the service for a particular data message. The particular service node may operate on a physical device separate from the network edge device or may operate on the network edge device (as a virtual machine, container, etc.). Additionally, the service node be a third party service node. The different uses of UUIDs, in some embodiments, depend on the structure of the service nodes.

For policy-based rules that apply to unicast as well as multicast data messages, in some embodiments, a separate determination that the data message is a multicast data message is made. In some embodiments, the determination is based on (1) a destination IP address being in a range of IP addresses assigned to multicast data messages (i.e., 224.0.0.0/4), (2) a bit in the destination MAC address (e.g., the last bit of the first octet) that indicates that the MAC address is a multicast MAC address, or (3) on both the IP and MAC addresses. The determination, in some embodiments, is a further condition specified in the actions of the policy-based routing rule.

For data messages identified as being multicast and as requiring a service, the method uses the UUID of a particular service node identified from the policy-based routing rule to identify a set of interfaces associated with the particular service node. The set of interfaces includes a first and second interface that are used as source and destination interfaces with the direction of the data message (north to south or south to north) determining, in some embodiments, which interface is used as a source and which is used as a destination. The identified interfaces, in some embodiments, are identified by MAC addresses associated with the first and second interfaces. The MAC addresses are then used to replace the source and destination MAC addresses of the received multicast data message and the modified data message is sent out the interface identified as the source interface (corresponding to the MAC address used as the source MAC address of the modified data message).

Upon receiving the modified data message, the service node provides the service (e.g., services the data message) and returns the serviced data message to the interface identified as the destination interface (i.e., the interface having the MAC address used as the destination MAC address in the modified data message). In some embodiments, the service node is a bump-in-the-wire service node that does not alter the header values of the serviced data message. In all embodiments, the service node preserves the destination IP address and the destination MAC address so as to enable delivery to the proper interface and the recovery of the multicast MAC address. The service node (or switches associated with the service node) forward the modified data message based on layer 2 (e.g., MAC) addresses such that the modified data message is treated as a unicast data message based on the unicast MAC address of the destination interface.

As discussed above, when the serviced data message is returned, the method modifies the destination MAC address of the serviced data message to be a multicast MAC address corresponding to the unmodified destination multicast IP address of the data message. The modification, in some instances is performed using a function that calculates a multicast MAC address from the multicast IP address (e.g., by using a prefix associated with multicast MAC addresses and a last 23 bits that match the last 23 bits of the multicast IP address), while in other embodiments a lookup table that stores the destination multicast IP and the original corresponding destination multicast MAC address is used to identify the correct destination multicast MAC address for the serviced data message. In some embodiments, the serviced data message is also modified by adding or modifying a tag bit to indicate that the particular service has been performed. The tag value (e.g., '0' or '1') is used, in some embodiments, in a policy-based routing rule as a condition for requiring a service, such that a set of specified attributes of a tagged data message match all the attributes specified in the policy-baser routing rule except for the tag value and based on the mismatch in tag values the data message is processed by the standard routing function without having the service provided for a second time. In some embodiments, a service chain may be identified with a set of multiple tags identifying each corresponding to a different service required by the data message.

The standard routing function forwards the multicast data message by identifying outgoing interfaces associated with the multicast IP address. In some embodiments, the outgoing interfaces are identified in an outgoing interfaces (OIF) list that is populated with all interfaces over which a join message has been received for the particular multicast group (i.e., multicast IP address). After identifying the outgoing interfaces, the routing function modifies each data message to identify the IP and MAC addresses of the interface on which the data message is forwarded as the source IP and MAC address of the data message while leaving the destination IP and MAC addresses as the multicast IP and MAC addresses of the original data message. This allows the data message to be identified by downstream routers as a multicast data message and to not return the data message to the interface from which it was received.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

As used in this document, the term data packet, packet, data message, or message refers to a collection of bits in a particular format sent across a network. It should be understood that the term data packet, packet, data message, or message may be used herein to refer to various formatted collections of bits that may be sent across a network, such as Ethernet frames, IP packets, TCP segments, UDP datagrams, etc. While the examples below refer to data packets, packets, data messages, or messages, it should be understood that the invention should not be limited to any specific format or type of data message. Also, as used in this document, references to L2, L3, L4, and L7 layers (or layer 2, layer 3, layer 4, layer 7) are references to the second data link layer, the third network layer, the fourth transport layer, and the seventh application layer of the OSI (Open System Interconnection) layer model, respectively.

A user-defined logical network as used in this application, refers to a particular logical abstraction of a network. In some embodiments, the logical abstraction includes logical counterparts to network elements of a physical network such as forwarding elements (e.g., switches, hubs, routers, bridges, etc.), load balancers, and firewalls. The logical forwarding elements (e.g., a logical switch or logical router) in some embodiments are implemented by a set of MFEs (e.g., physical or virtual/software switches, or routers) executing on host machines. A particular host machine may host data compute nodes (DCNs) (e.g., containers or virtual machines (VMs)) connected to multiple different logical networks and the set of MFEs implements all the logical networks to which the DCNs logically connect. Additional details of the structure and function of logical networks are described in U.S. Pat. No. 9,787,605 which is hereby incorporated by reference.

Some embodiments of the invention provide novel methods for providing a transparent service for multicast data messages traversing a network edge forwarding element (e.g., a network edge forwarding element executing on an NSX edge) operating at a boundary between two networks (e.g., an external site and a local site operating the network edge device). In some embodiments, the local site implements a logical network that includes machines that may be sources or destinations of multicast data messages.

Figure 1:
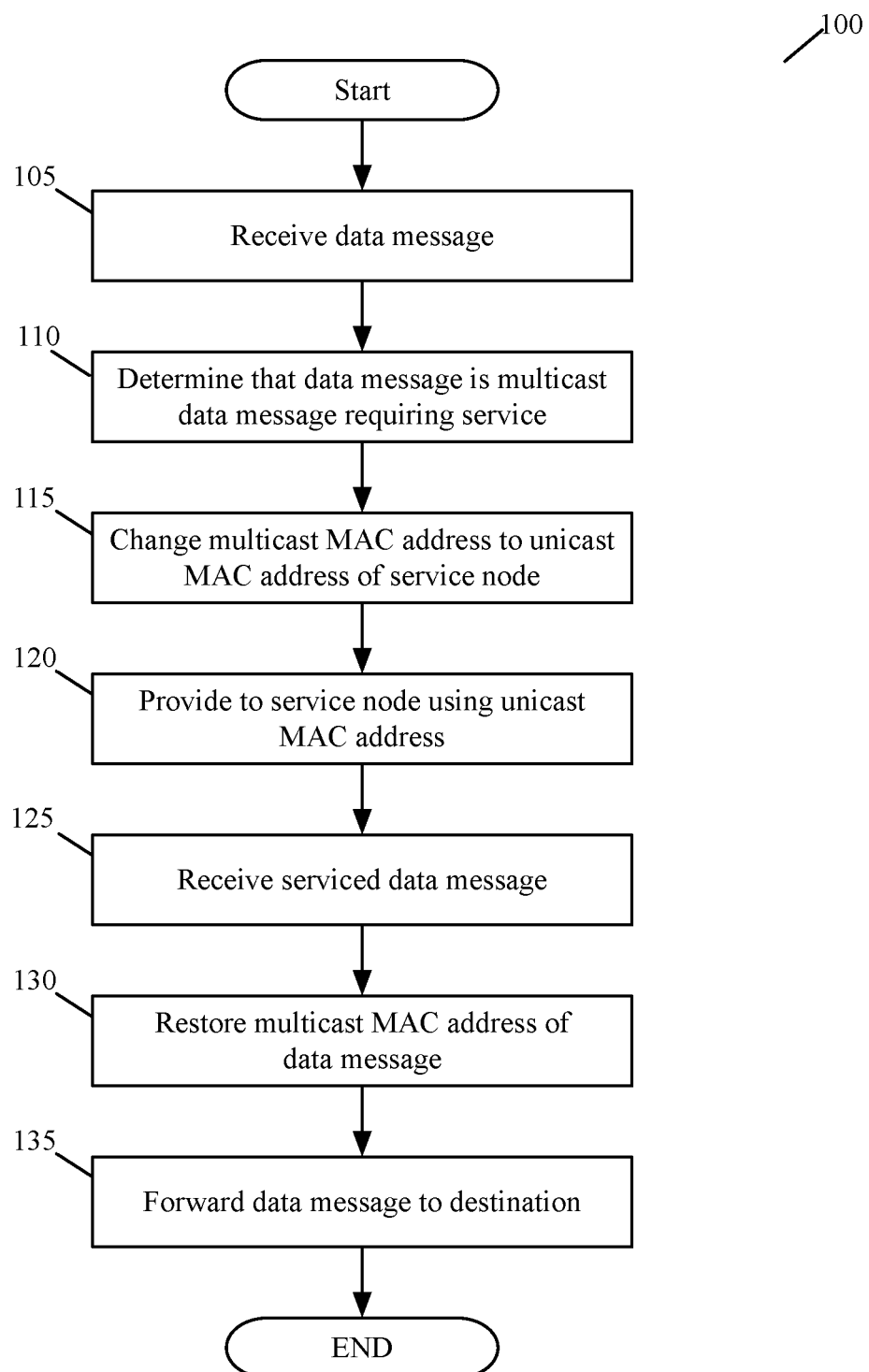
FIG. 1 conceptually illustrates a process for providing a service at the network edge.
Figure 2:
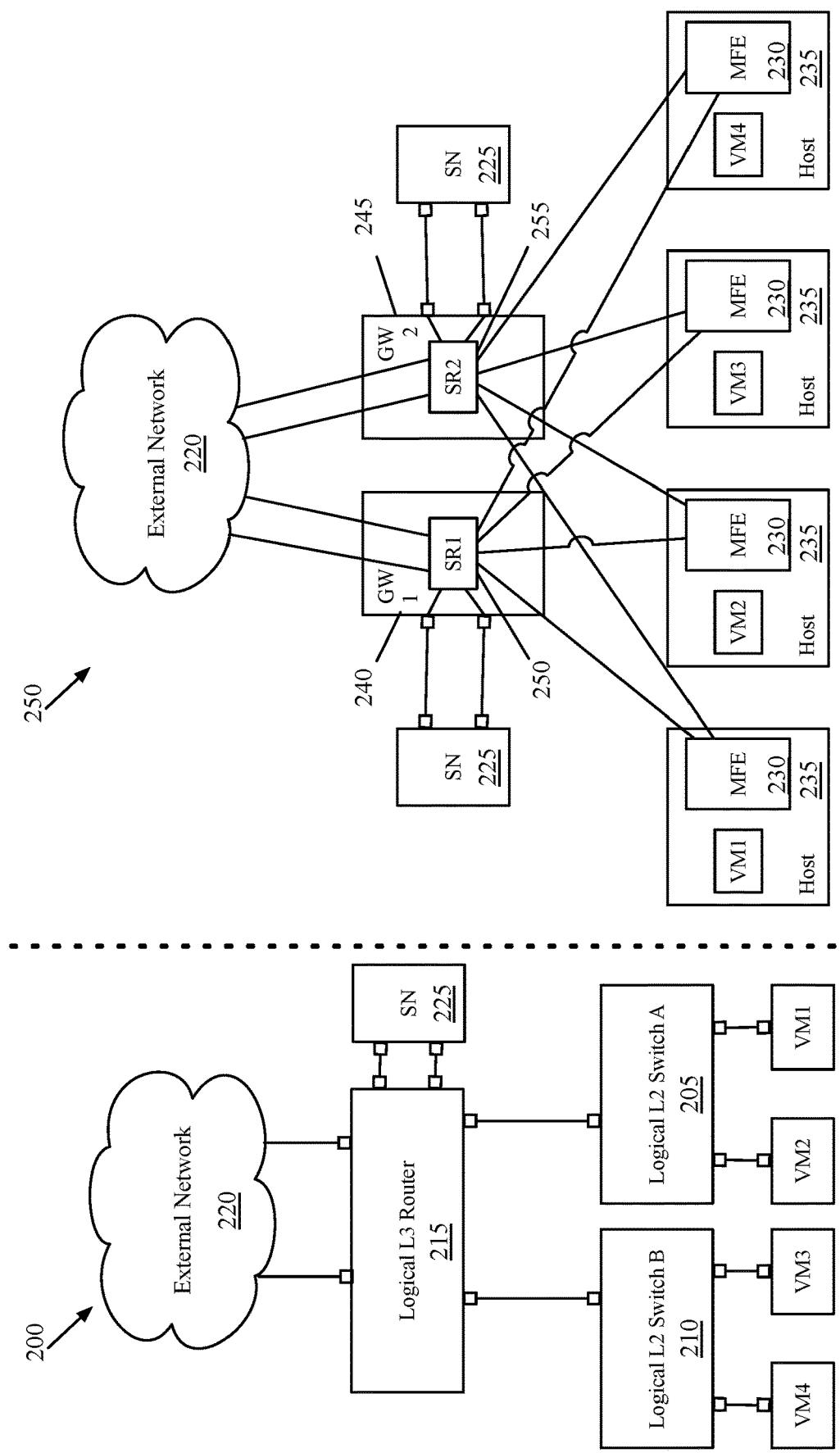
FIG. 2 illustrates two different views of a network configured to use a centralized logical router implementation to provide a service at the network edge.

FIG. 1 conceptually illustrates a process 100 for providing a service at the network edge. Process 100 will be described in relation to FIG. 2 illustrating an exemplary embodiment in which the process 100 is performed. FIG. 2 illustrates two different views of a network configured to use a centralized logical router implementation to provide a service at the network edge. FIG. 2 specifically illustrates the configuration view on the left of the dotted line, which represents a logical network 200 as designed by a user. As shown, the logical router 215 is part of a logical network 200 that includes the logical router 215 and two logical switches 205 and 210. The two logical switches 205 and 210 each have VMs that connect to logical ports. While shown as VMs in these figures, it should be understood that other types of data compute nodes (e.g., namespaces, etc.) may connect to logical switches in some embodiments. The logical router 215 also includes two ports that connect to the external physical network 220 and an additional two ports that connect to a service node 225 for providing a service to data messages received at the logical router.

FIG. 2 illustrates, to the right of the dotted line, the physical centralized implementation 270 of the logical router 215. As shown, each of the VMs that couples to one of the logical switches 205 and 210 in the logical network 200 operates on a host machine 205. The MFEs 230 that operate on these host machines are virtual switches (e.g., OVS, ESX) that operate within the hypervisors or other virtualization software on the host machines. These MFEs perform first-hop switching for the logical switches 205 and 210 for packets sent by the VMs of the logical network 200. The MFEs 230 (or a subset of them) also may implement logical switches (and distributed logical routers) for other logical networks if the other logical networks have VMs that reside on the host machines 235 as well. The logical router 215 is implemented by a set of service routers (SRs) 250 and 255 (e.g., network edge forwarding elements). In the depicted embodiment, the SRs operate in active-standby mode, with one of the SRs active and the other operating as a standby (in case of the failure of the active SR). In other embodiments, the SRs operate in an active-active mode (for load balancing non-stateful services). Each of the logical switches 205 and 210 has a connection to each of the SRs 250 and 255.

The two service routers 250 and 255 each operate on a different gateway machine 240 and 245 (e.g., network edge devices). The gateway machines 240 and 245 are host machines similar to the machines 235 in some embodiments, but host service routers rather than user VMs. In some embodiments, the gateway machines 240 and 245 each include an MFE as well as the service router, in order for the MFE to handle any logical switching necessary. For instance, packets sent from the external network 220 may be routed by the service router implementation on the gateway and then subsequently switched by the MFE on the same gateway. The gateway devices are each shown as connecting to a service node (SN) 225 shown as a separate device. The SNs 225 are implemented on the gateway devices 240 and 245 as a namespace, a virtual machine, or a container in different embodiments. In embodiments with multiple service nodes there may be a combination of local and external service nodes in any form factor described above.

The SRs may be implemented in a namespace, a virtual machine, or as a VRF in different embodiments. The SRs may operate in an active-active or active-standby mode in some embodiments, depending on whether any stateful services (e.g., firewalls) are configured on the logical router. When stateful services are configured, some embodiments require only a single active SR. In some embodiments, the active and standby service routers are provided with the same configuration, but the MFEs 230 are configured to send packets via a tunnel to the active SR (or to the MFE on the gateway machine with the active SR). Only if the tunnel is down will the MFE send packets to the standby gateway.

The gateway machines 240 and 245 are configured, in some embodiments, to provide received data messages to service nodes executing locally on gateway machines or to service nodes executing on other physical machines (e.g., SNs 225) to provide a service to the received data messages. The service nodes, in some embodiments, are provided by third-party vendors and provide transparent (e.g., bump-in-the-wire) services that do not change the source and destination addresses of a serviced data message.

Process 100 of FIG. 1, in some embodiments, is performed by a network edge forwarding element (e.g., an SR 250 or 255 on a gateway machine 240 or 245). The process begins by receiving (at 105) a data message at the gateway machine. The data message may be received from a machine within the logical network (e.g., a virtual machine) or from a source in the external network 220. In the process described the data message is assumed to be a multicast data message that requires a service and a more complete description of a process 400 for handling all types of data messages is conceptually illustrated in FIG. 4.

After receiving (at 105) the data message the process 100 analyzes the data message and determines (at 110) that the data message is a multicast data message that requires a service. The determination, in some embodiments, is based on a set of policy-based routing (PBR) rules that define policies for handling data messages matching specified criteria. In some embodiments, the specified criteria include criteria that are not in L2-L4 headers. Additionally, the policies may specify actions in addition to, or instead of, identifying a next hop. For example, a PBR rule, in some embodiments, specifies a UUID associated with a service node to provide a service required for the data message. In some embodiments, a separate determination is made as to whether a data message requiring a service based on a PBR rule is a multicast data message (i.e., has a multicast destination address). The determination is made based on at least one of a destination internet protocol (IP) address (e.g., by identifying the multicast prefix 224.0.0.0/4) and a destination media access control (MAC) address (e.g., by identifying that the last bit of the first octet is equal to 1).

Once the process 100 determines (at 110) that the data message is a multicast data message that requires a service, the service changes (at 115) the multicast destination MAC address to a unicast destination MAC address associated with a service node that provides the service to the data message. In some embodiments, the service node is identified in the determining operation as the determination is based on a PBR rule identifying a service node as a next hop and providing information to determine at least one MAC address associated with the service node.

After changing (at 115) the multicast destination MAC address into the unicast destination MAC address, the process 100 provides (at 120) the data message to the service node for the service node to provide the service. In some embodiments, providing the data message to the service node includes bypassing a routing function (i.e., not using layer 3 attributes of the data message to forward the message) in order to avoid providing the unserviced data message to a set of outgoing interfaces associated with the multicast destination IP address. Instead, the process provides the data message to the service node using a layer 2 processing that identifies destinations based on the MAC address.

Once the service node has provided the required service, the service node sends the serviced data message back to the network edge forwarding element (e.g., SR 250 or 255) which receives (at 125) the data message. The process 100 then restores (at 130) the multicast destination MAC to the original multicast destination MAC address of the received data message. Restoring (at 130) the MAC address, in some embodiments, is performed by a module in the network edge forwarding element that determines that the data message is a multicast data message that should have its multicast MAC address restored based on at least the presence of a multicast destination IP address and at least one of a service interface and a determination that the data message has been received from the service engine. In some embodiments, the multicast destination MAC address is stored in a table associated with the multicast destination IP address and restoring the multicast destination MAC address includes identifying the multicast destination MAC address using the multicast destination IP address. In other embodiments, the multicast destination MAC address is generated from the multicast destination IP address through a known process (i.e., using the last 23 bits of the multicast IP address as the last 23 bits of a multicast MAC address where the first 25 bits of the multicast MAC address are a prefix that identifies the MAC address as a multicast MAC address).

Once the multicast destination MAC address has been restored (at 130), the process forwards (at 135) the serviced data message to the set of destinations. In some embodiments, forwarding the data message includes identifying outgoing interfaces associated with the multicast IP address. In some embodiments, the outgoing interfaces are identified in an outgoing interfaces (01F) list that is populated with all interfaces over which a join message has been received for the particular multicast group (i.e., multicast IP address) (excluding the interface on which the multicast data message was received. After identifying the outgoing interfaces, the routing function modifies each data message to identify the IP and MAC addresses of the interface on which the data message is forwarded as the source IP and MAC address of the data message while leaving the destination IP and MAC addresses as the multicast IP and MAC addresses of the original data message. This allows the data message to be identified by downstream routers as a multicast data message and to not return the data message to the interface from which it was received.

For network traffic coming from the external network 220, the set of outgoing interfaces includes the interfaces of the SR 250 or 255 that are connected to MFEs 230 executing on hosts 235 with machines (e.g., VMs) that have joined the multicast group associated with the multicast destination IP address of the data message. The SR, in some embodiments, will first forward the traffic to a single interface connected to a distributed router implemented on the gateway device 240 or 245 and then perform the distributed router processing to identify the set of outgoing interfaces associated with the MFEs 230 or the hosts 235. For network traffic being sent to the external network 220, the set of outgoing interfaces include any routers in the external network connected to the SR 250 or 255 (or gateway device 240 or 245) that have joined the multicast group associated with the multicast destination IP address. Once the serviced data message is forwarded (at 135) the process 100 ends.

By avoiding the routing function when providing the data message to the service node, the method ensures that the data message is not sent, before the service is provide, by the standard routing function to the destinations associated with the destination multicast internet protocol (IP) address. Furthermore, by changing only the destination MAC address while maintaining the destination multicast IP address throughout the data message processing, the method is able to generate the original destination multicast MAC address using known techniques (i.e., using the last 23 bits of the multicast IP address as the last 23 bits of a multicast MAC address where the first 25 bits of the multicast MAC address are prefix that identifies the MAC address as a multicast MAC address).

Figure 3:
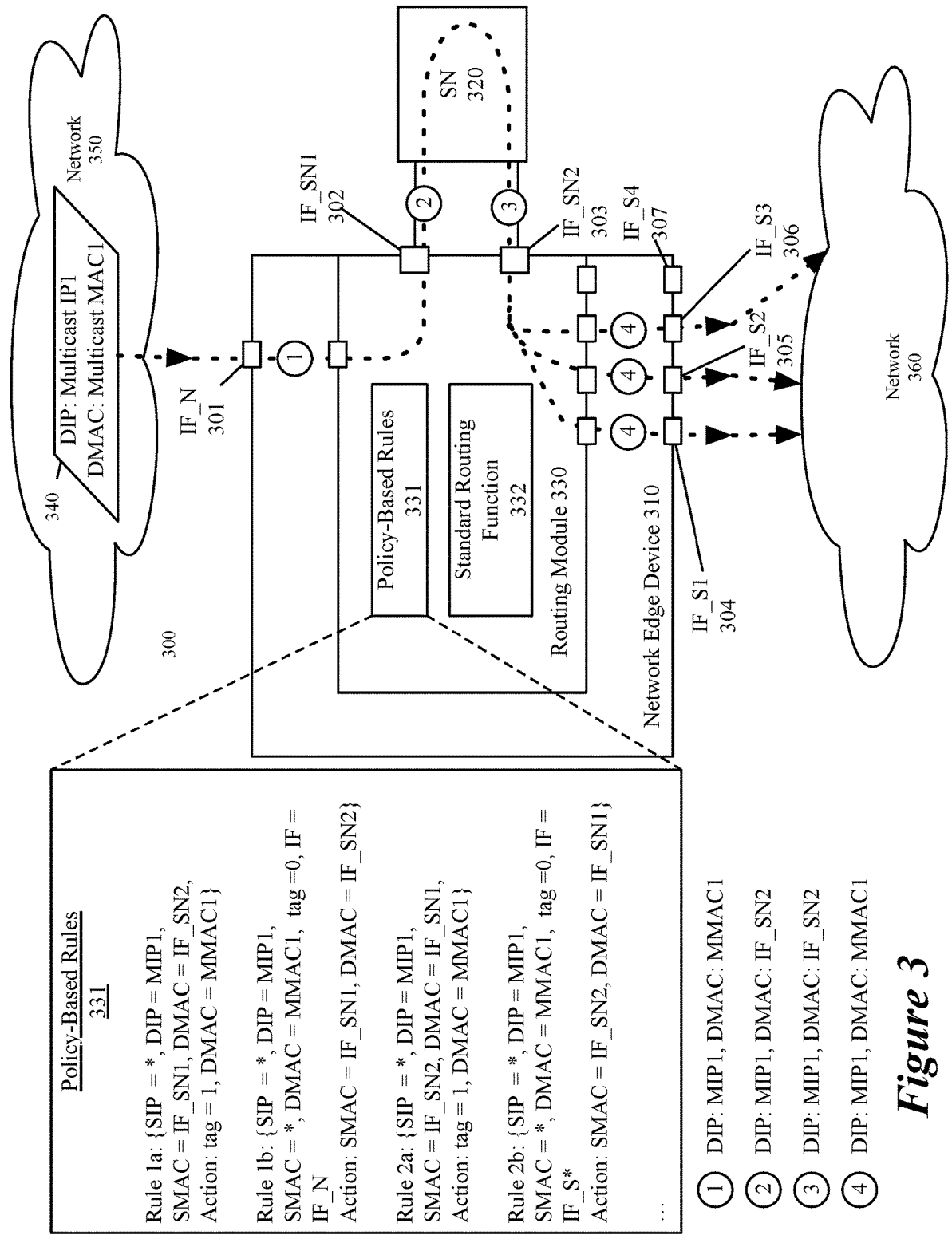
FIG. 3 conceptually illustrates a network edge device of some embodiments processing a multicast data message requiring a service.

FIG. 3 illustrates a system 300 including an exemplary network edge device 310 (similar to gateway device 240) providing a transparent service for a multicast data message traversing the network edge device 310. The network edge device 310 operates between a first (external) network 350 and a second (internal) network 360. In some embodiments, network edge device 310 is part of network 360, but is shown outside the network 360 for clarity. The network edge device is illustrated as executing a routing module 330 that includes the policy based routing rules 331 and a standard routing function 332. The standard routing function, in some embodiments, performs standard routing operations that identify an outgoing interface for a unicast data messages (or interfaces for multicast/broadcast data messages) based on a destination IP address. In some embodiments, the policy-based rules 331 are used to analyze data messages before the data messages are provided to the standard routing function 332. Additional logical switches and other components of the network edge device 310 are omitted here for clarity.

Network edge device 310 also includes a set of interfaces 301 (e.g., "IF N" a north-facing interface) and 304-307 (e.g., IF_S1 to IF_S4 a set of south-facing interfaces) connecting the network edge device 310 to the external and internal networks, respectively. Additionally, the network edge device 310 has a set of interfaces 302 and 303 (IF_SN1 and IF_SN2, respectively) for connecting to a service node (SN) 320. As shown the interfaces of the network edge device 310 correspond to (unlabeled) interfaces of the routing module 330. One of ordinary skill in the art will understand that the SPN 320 may instead be implemented as a container or service virtual machine executing on the network edge device 310 and represents only a single service node and associated interfaces where other embodiments will have multiple service nodes or service node clusters each with their own associated interfaces.

FIG. 3 illustrates a multicast data message 340 being received at the north-facing interface (IF N) 301 and being processed through the routing module 330 to forward the data message to SPN 320. The data message is returned to the network edge device 310 and forwarded out south-facing interfaces 304-306 (IF_SN1 to IF_SN3) associated with the destination multicast IP address. In some embodiments, the policy-based routing rules 331 are responsible for directing the original data message to the SPN 320 and directing serviced data messages to the standard routing function 332, while the standard routing module 332 is responsible for identifying the outgoing interfaces for a serviced multicast data message (e.g., interfaces 304-306 in the illustrated embodiment). The circled number "1"-"4" identify different points in the processing of a data message through the network edge device 310 and service node 320. Additionally, the key in the lower left hand corner indicates the destination IP (DIP) and destination MAC (DMAC) address of the data message at the different identified points in the processing. As shown, the data message at points "1" and "4" have the destination IP and destination MAC of the originally received packet, while data messages "2" and "3" have the original destination IP address and the modified destination MAC address used to direct the data message to the service node 320.

FIG. 3 also illustrates a set of exemplary policy-based rules (i.e., rules 1a, 1b, 2a, and 2b) in the policy-based rules 331 that apply to a multicast data message having a particular multicast destination IP ("MIP1"). Rules 1a and 1b are one set of rules that might be specified (e.g., by a user) to apply to south-bound multicast traffic for data messages having multicast destination IP address MIP1. Rule 1a is specified to be of higher priority and based on the specified SMAC and DMAC applies to a data message returned from the SPN 320 for south-bound data messages (assuming that south-bound data messages are sent out IF_SN1 to IF_SN2 with north-bound data messages being sent out IF_SN2 to IF_SN1). The action fields of rule 1a specify that the packet is tagged as having been serviced and that the DMAC is updated with the MAC address ("MMAC1") corresponding to the destination multicast IP address MIP1. As specified in FIG. 3, the rule uses wildcard values ("*") for source IP (SIP), but one of ordinary skill in the art will appreciate that a specific IP address or subnet is used in some embodiments to specify the source IP address.

Rule 1b is specified to apply to a south-bound multicast data message received at the interface IF N 301 with destination IP address MIP1 with any source IP and source MAC address (indicated by the wildcard symbol *). Rule 1b also includes a requirement that the tag value is equal to 0 such that any data message that hits rule 1a will no longer hit rule 1b). However, for newly received multicast data messages, the action specified in rule 1b updates the source and destination MAC to be the MAC addresses of IF_SN1 and IF_SN2 respectively so that the south-bound data message is passed through the SPN 320 in a direction that indicates that the data message is south-bound. Rules 2a and 2b that would apply to a north-bound data message with destination multicast IP address MIP1 are also illustrated to indicate that the interfaces/MAC addresses identified as the source and destination interfaces/MAC addresses are reversed in rule 2b to indicate that the data message is north-bound. One of ordinary skill in the art will understand that the illustrated rules are merely exemplary and that many more rules will be specified in some embodiments, and that the rules may specify any relevant data message attribute and associated actions.

Figure 4:
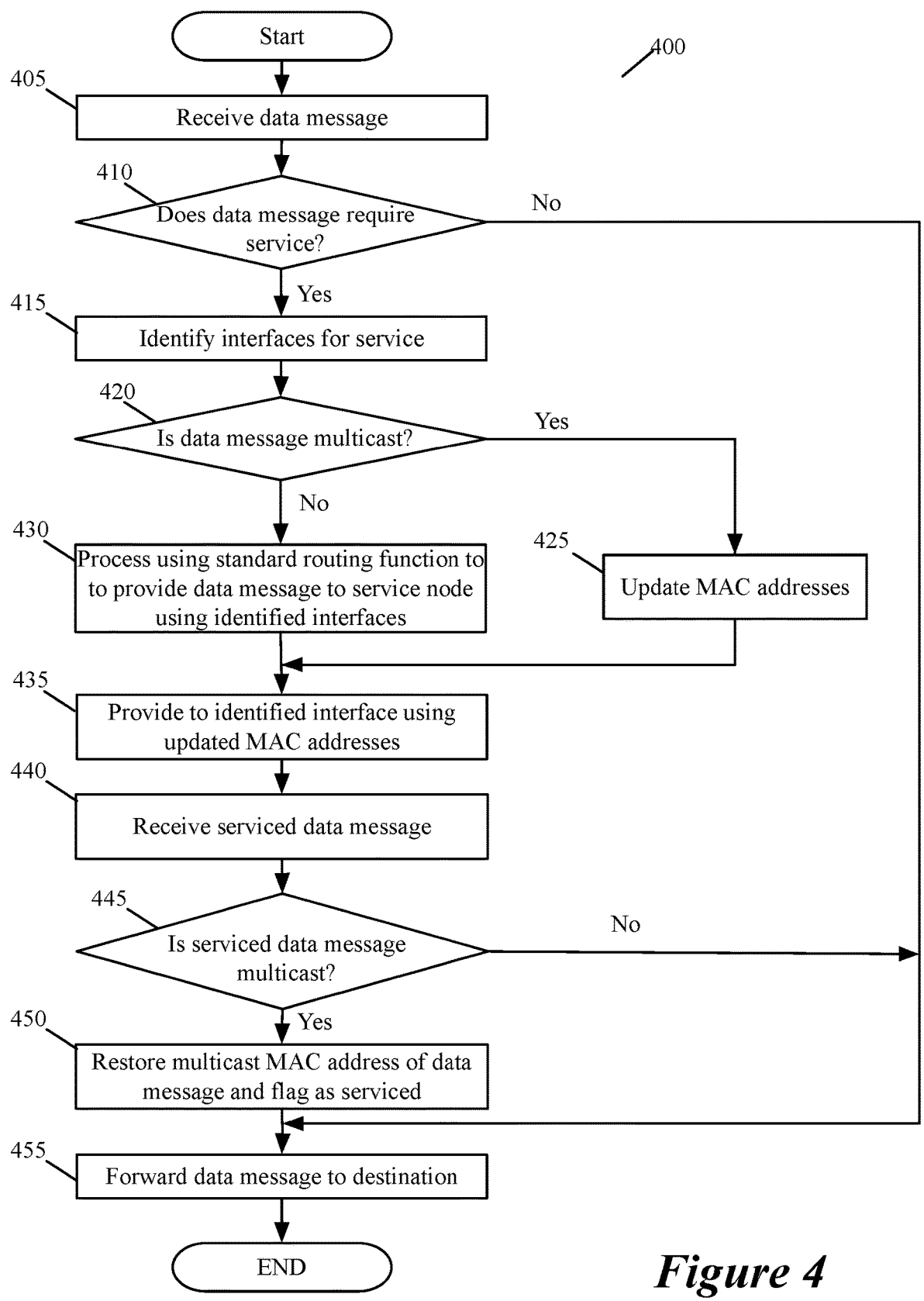
FIG. 4 conceptually illustrates a process for processing data messages received at the network edge device.

FIG. 4 conceptually illustrates a process 400 for processing data messages received at a network edge device (e.g., network edge device 3110) to provide forwarding and a set of transparent services (e.g., edge services such as network address translation (NAT), firewall, load balancing, etc.). The process 400 is performed by a network edge device, in some embodiments, although one of ordinary skill in the art will appreciate that different operations of process 400 are performed by different elements of the network edge device. Process 400 begins (at 405) by receiving a data message. In some embodiments, the data message is a data message traversing the network edge device (e.g., a north-south data message) received at any one of a plurality of south-facing or north-facing interfaces of the network edge device. In some embodiments, the data message is a data message internal to the southern network (e.g., an east-west data message) that requires a centralized service provided at the network edge device.

After receiving (at 405) the data message, the process 400 determines (at 410) whether the data message requires a service. Identifying that the data message requires a particular service, in some embodiments, includes using policy-based routing rules that each specify a set of data message attributes (e.g., an n-tuple, or an n-tuple and a VLAN tag, etc.) and a set of actions (e.g., modifying the data message, or identifying a next hop for the data message) for data messages with attributes that match the specified set of data message attributes. In some embodiments, identifying that a data message requires a particular service includes an action that specifies a universally unique identifier (UUID) of a service node for a required service.

In some embodiments, the UUID for a first set of services identifies a service node cluster and a particular service provide node in the service node cluster is further identified using a separate UUID or a network or link layer address identifying the particular service node of the service node cluster (i.e., associated with the cluster's UUID). For a second set of services, the UUID identifies, in some embodiments, a particular service node directly. In some embodiments, a set of UUIDs identifying particular service nodes may also be specified in the policy-based routing rule with one of the UUIDs being selected at random or based on a load balancing operation to provide the service for a particular data message. The particular service node identified using the policy-base routing rules may operate on a physical device separate from the network edge device or may operate on the network edge device (as a virtual machine, container, etc.). Additionally, the service node be a third party service node. The different uses of UUIDs, in some embodiments, depend on the structure of the service nodes.

If the process 400 determines (at 410) that the data message does not require a service, the process 400 forwards (at 455) the data message. Determining that a data message does not require a service, in some embodiments, includes not finding a matching policy-based routing rule in a set of policy-based routing rules. In some embodiments, forwarding the data message includes processing the data message using the standard routing function of the network edge device to determine a next hop for the data message. The standard routing function, in some embodiments, determines a next hop based on the destination IP address (whether unicast or multicast).

If the process 400 determines (at 410) that the data message requires a service, the process 400 identifies (at 415) a set of interfaces associated with the service node for the required service. The set of interfaces, in some embodiments, are a pair of interfaces that are both connected to the network edge device such that the data message is sent and received by the network edge device without any change in the data message headers performed by the service node (e.g., the service is provided transparently, or as a bump-in-the-wire service). In some embodiments, the set of interfaces is identified using the UUIDs identified from the policy-based routing rule that matches the received data message. The UUIDs, in some embodiments are used to identify MAC addresses of the interfaces. One of ordinary skill in the art will appreciate that there are a number of other ways to identify the set of interfaces associated with a particular service node or cluster selected to provide a service.

Some embodiments not only identify the set of interfaces, but also identify which interface will be designated the source and which will be designated the destination based on the interface of the network edge device on which the data message was received. Identifying one interface as a destination for all traffic traversing from a north-facing interface to a south-facing interface and the other interface as the destination for all traffic in the other direction allows the data messages direction to be assessed from the destination MAC address of the data messages received from the service nodes.

After identifying (at 415) the interfaces associated with a service node, the process 400 determines (at 420) if the data message is a multicast data message. In some embodiments, the determination is based on (1) a destination IP address being in a range of IP addresses assigned to multicast data messages (i.e., 224.0.0.0/4), (2) a bit in the destination MAC address (e.g., the last bit of the first octet) that indicates that the MAC address is a multicast MAC address, or (3) on both the IP and MAC addresses. The determination, in some embodiments, is a further condition specified in the actions of the policy-based routing rule. For policy-based rules that apply to unicast as well as multicast data messages, in some embodiments, this determination is an independent determination of whether the data message is a multicast data. In some embodiments, the determination is inherent in a policy-based rule and does not require the separate determination of operation 420.

If the process determines (at 420) that the data message is not a multicast data message the process 400 uses (at 430) the standard routing function to route/forward the unicast data message to the identified service node interfaces. Alternatively, if the process determines (at 420) that the data message is a multicast data message, the process bypasses the standard routing function and updates (at 425) the source and destination MAC addresses to those identified for the service node.

After either processing (at 430) the data message by the standard routing function or updating (at 425) the MAC addresses of the data message, the data message is sent (at 435) out of the interface identified as the outgoing (source) interface for the service node (e.g., based on the direction of the traffic) to be returned on the interface identified as the destination interface. Upon receiving the modified data message, the service node provides the service (e.g., services the data message) and returns the serviced data message to the interface identified as the destination interface (i.e., the interface having the MAC address used as the destination MAC address in the modified data message). In some embodiments, the service node is a bump-in-the-wire service node that does not alter the header values of the serviced data message. In all embodiments, the service node preserves the destination IP address and the destination MAC address so as to enable delivery to the proper interface and the recovery of the multicast MAC address. The service node (or switches associated with the service node) forward the modified data message based on layer 2 (e.g., MAC) addresses such that the modified data message is treated as a unicast data message based on the unicast MAC address of the destination interface.

The serviced data message is then received (at 440) by the network edge device from the service node. When the serviced data message is returned, the method determines (at 445) if the data message is a multicast data message. In some embodiments, the determination is based on the destination IP address (e.g., if the destination IP address is in the 244.0.0.0/4 subnet). If the process determines (at 445) that the data message is a multicast data message, the process restores (at 450) the destination MAC address of the serviced data message to be the multicast MAC address corresponding to the unmodified destination multicast IP address of the data message. The restoration, in some instances is performed using a function that calculates a multicast MAC address from the multicast IP address (e.g., by using a prefix associated with multicast MAC addresses and a last 23 bits that match the last 23 bits of the multicast IP address), while in other embodiments a lookup table that stores the destination multicast IP and the original corresponding destination multicast MAC address used to identify the correct destination multicast MAC address for the serviced data message.

In some embodiments, the serviced data message is also modified (at 450) by adding or modifying a tag bit to indicate that the particular service has been performed. The tag value (e.g., '0' or '1') is used, in some embodiments, in a policy-based routing rule as a condition for requiring a service, such that a set of specified attributes of a tagged data message match all the attributes specified in the policy-based routing rule except for the tag value and based on the mismatch in tag values the data message is processed by the standard routing function without having the service provided for a second time. In some embodiments, a service chain may be identified with a set of multiple tags identifying each corresponding to a different service required by the data message.

After the multicast data message has its multicast MAC address restored (at 450) or the data message is determined (at 445) to be a unicast data message the data message is forwarded (at 455) to the destination (or set of destinations for a multicast data message). In some embodiments, the forwarding is performed by a standard routing function that identifies a destination (or set of destinations) based on the destination IP address of the data message. For multicast data messages a standard routing function forwards the multicast data message by identifying outgoing interfaces associated with the multicast IP address. In some embodiments, the outgoing interfaces are identified in an outgoing interfaces (OIF) list that is populated with all interfaces over which a join message has been received for the particular multicast group (i.e., multicast IP address). After identifying the outgoing interfaces, the routing function modifies each data message to identify the IP and MAC addresses of the interface on which the data message is forwarded as the source IP and MAC address of the data message while leaving the destination IP and MAC addresses as the multicast IP and MAC addresses of the original data message. This allows the data message to be identified by downstream routers as a multicast data message and to not return the data message to the interface from which it was received.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 5:
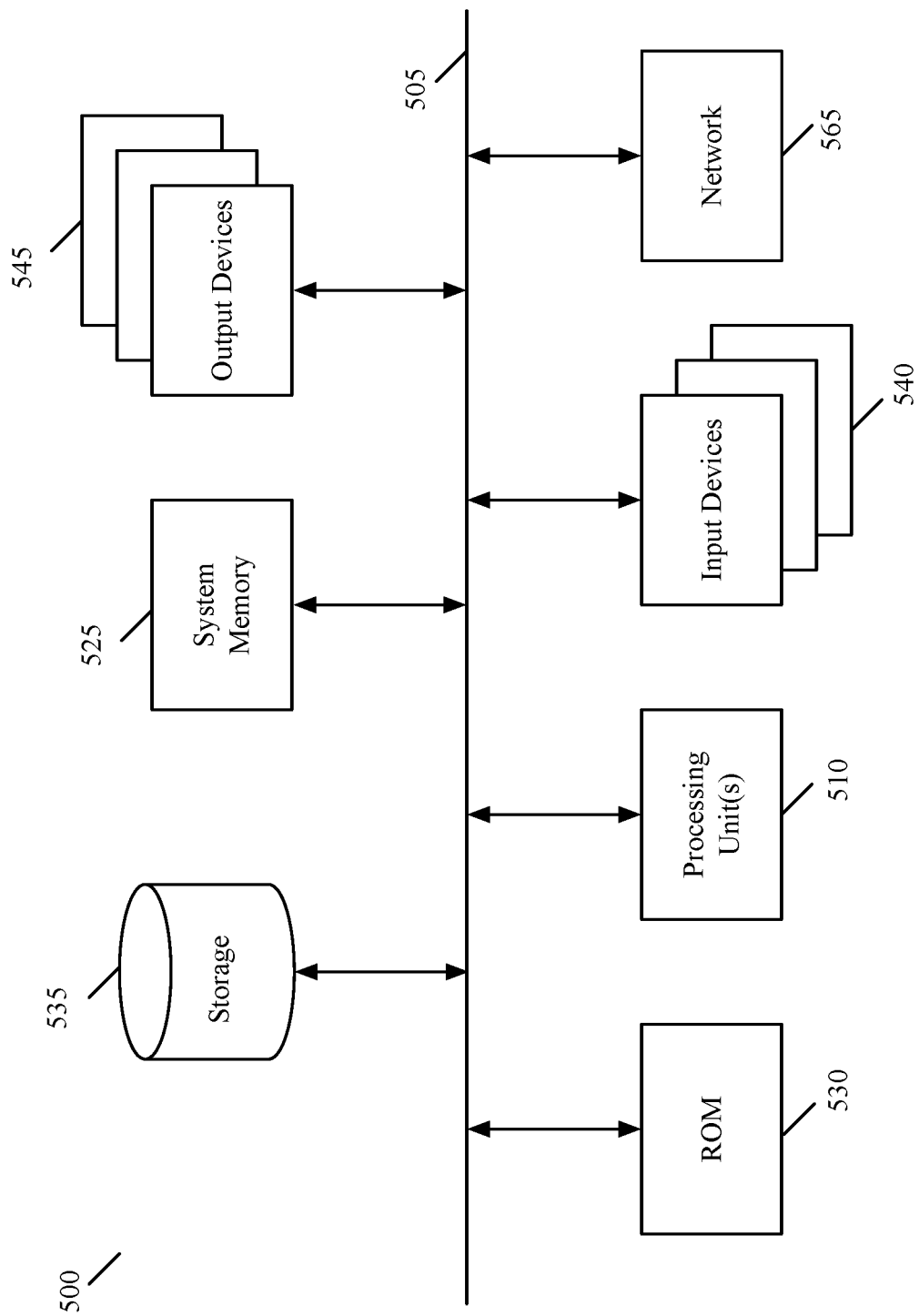
FIG. 5 conceptually illustrates a computer system with which some embodiments of the invention are implemented.

FIG. 5 illustrates the system 500 of some embodiments. As shown, this system includes multiple virtualized hosts 505 and 510, a set of network manager computers 520, and a network edge device 515. The virtualized hosts 505 and 510 host compute nodes that can be sources and destinations of data messages sent through network 575 and network edge device 515 to or from a compute node in network 585. The network edge device is shown executing a set of service engines (e.g., service engine instances) 545. As shown in FIG. 5, the hosts 505 and 510, the controller set 520, and the network edge device 515 communicatively couple through a network 575, which can include a local area network (LAN), a wide area network (WAN) or a network of networks (e.g., Internet).

The set of network manager computers 520 provide control and management functionality for defining and managing the instantiation of one or more GVMs on each host (for the purposes of this discussion, network controllers 520 includes both management plane and control plane controllers). These controllers are also responsible, in some embodiments, for configuring the network edge device to provide the functionality described above. These controllers, in some embodiments, also provide control and management functionality for defining and managing multiple logical networks that are defined on the common software forwarding elements of the hosts.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 5 conceptually illustrates a computer system 500 with which some embodiments of the invention are implemented. The computer system 500 can be used to implement any of the above-described hosts, controllers, and managers. As such, it can be used to execute any of the above described processes. This computer system includes various types of non-transitory machine readable media and interfaces for various other types of machine readable media. Computer system 500 includes a bus 505, processing unit(s) 510, a system memory 525, a read-only memory 530, a permanent storage device 535, input devices 540, and output devices 545.

The bus 505 collectively represents all system, peripheral, and chipset buses that communicatively connect the numerous internal devices of the computer system 500. For instance, the bus 505 communicatively connects the processing unit(s) 510 with the read-only memory 530, the system memory 525, and the permanent storage device 535.

From these various memory units, the processing unit(s) 510 retrieve instructions to execute and data to process in order to execute the processes of the invention. The processing unit(s) may be a single processor or a multi-core processor in different embodiments. The read-only-memory (ROM) 530 stores static data and instructions that are needed by the processing unit(s) 510 and other modules of the computer system. The permanent storage device 535, on the other hand, is a read-and-write memory device. This device is a non-volatile memory unit that stores instructions and data even when the computer system 500 is off. Some embodiments of the invention use a mass-storage device (such as a magnetic or optical disk and its corresponding disk drive) as the permanent storage device 535.

Other embodiments use a removable storage device (such as a floppy disk, flash drive, etc.) as the permanent storage device. Like the permanent storage device 535, the system memory 525 is a read-and-write memory device. However, unlike storage device 535, the system memory is a volatile read-and-write memory, such a random access memory. The system memory stores some of the instructions and data that the processor needs at runtime. In some embodiments, the invention's processes are stored in the system memory 525, the permanent storage device 535, and/or the read-only memory 530. From these various memory units, the processing unit(s) 510 retrieve instructions to execute and data to process in order to execute the processes of some embodiments.

The bus 505 also connects to the input and output devices 540 and 545. The input devices enable the user to communicate information and select commands to the computer system. The input devices 540 include alphanumeric keyboards and pointing devices (also called "cursor control devices"). The output devices 545 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 5, bus 505 also couples computer system 500 to a network 565 through a network adapter (not shown). In this manner, the computer can be a part of a network of computers (such as a local area network ("LAN"), a wide area network ("WAN"), or an Intranet, or a network of networks, such as the Internet. Any or all components of computer system 500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method of performing a service on a multicast data message at a network edge between a source network and a destination network, the method comprising:
   at a network edge forwarding element;
      analyzing a destination address of a received data message to determine that the destination address is a multicast destination address and that the received data message requires a particular service;
      changing a destination media access control (MAC) address of the received data message from a multicast MAC address to a unicast MAC address associated with a service node that performs the particular service;
      providing the data message to the service node to perform the service;
      after receiving the serviced data message from the service node, changing the destination MAC address of the serviced data message to the multicast MAC address; and
      forwarding the serviced data message to the destination network to reach multicast destinations of the data message,
      wherein the analyzed destination address is at least one of a destination internet protocol (IP) destination address and the destination MAC address of the received data message,
      wherein determining that the received data message requires a particular service comprises examining policy-based routing rules that identify the particular service as being required by the received data message.

2. The method of claim 1, wherein determining that the destination address is a multicast destination address comprises at least one of:
   using a prefix of the destination IP address of the received data message to determine that the destination address is a multicast destination address; and
   using a last bit in a first octet of the destination MAC address of the received data message to determine that the destination address is a multicast destination address.

3. The method of claim 1, wherein the policy-based routing rules identify a universally unique identifier (UUID) associated with the particular service.

4. The method of claim 3, wherein the UUID is further associated with a plurality of service nodes providing the particular service and providing the data message to the service node comprises:
   selecting the service node from the plurality of service nodes providing the particular service associated with the UUID; and
   providing the data message directly to an interface of the network edge forwarding element connected to the selected service node.

5. The method of claim 1, wherein the source network is a logical network implementing the network edge forwarding element and the destination network is an external network.

6. The method of claim 1, wherein the service node comprises a third party service node.

7. The method of claim 1, wherein the service node comprises a service virtual machine that provides the particular service.

8. The method of claim 1 further comprising including a tag in the serviced data message indicating that the particular service has been performed on the serviced data message.

9. The method of claim 1 wherein forwarding the serviced data message to the destination network comprises identifying a set of outgoing interfaces for the multicast data message.

10. The method of claim 1, wherein changing the destination MAC address of the serviced data message comprises calculating the multicast MAC address based on a destination internet protocol (IP) address of the serviced data message.

11. A method of performing a service on a multicast data message at a network edge between a source network and a destination network, the method comprising:
    at a network edge forwarding element:
       analyzing a destination address of a received data message to determine that the destination address is a multicast destination address and that the received data message requires a particular service;
       changing a destination media access control (MAC) address of the received data message from a multicast MAC address to a unicast MAC address associated with a service node that performs the particular service;
       providing the data message to the service node to perform the service;
       after receiving the serviced data message from the service node, changing the destination MAC address of the serviced data message to the multicast MAC address; and
       forwarding the serviced data message to the destination network to reach multicast destinations of the data message, wherein the unicast MAC address is a first unicast MAC address associated with a first interface of the service node, and providing the received data message to the service node comprises:

changing a source MAC address of the received data message to a second unicast MAC address associated with a second interface of the service node; and providing the data message, without routing the data message based on a destination internet protocol (IP) address, to the service node from the second interface to be received at the first interface.

12. The method of claim 11, wherein the particular service node provides a bump-in-the-wire service that does not change the IP addresses of the serviced data message.

13. The method of claim 12, wherein the particular service node does not change the MAC addresses of the serviced data message.

14. A method of performing a service on a multicast data message at a network edge between a source network and a destination network, the method comprising:

at a network edge forwarding element:
analyzing a destination address of a received data message to determine that the destination address is a multicast destination address and that the received data message requires a particular service;
changing a destination media access control (MAC) address of the received data message from a multicast MAC address to a unicast MAC address associated with a service node that performs the particular service;
providing the data message to the service node to perform the service;
after receiving the serviced data message from the service node, changing the destination MAC address of the serviced data message to the multicast MAC address;
forwarding the serviced data message to the destination network to reach multicast destinations of the data message; and
including a tag in the serviced data message indicating that the particular service has been performed on the serviced data message,
wherein the tag indicates that the serviced data message does not require the particular service and forwarding the serviced data message to the destination network is based on the tag indicating that the service has been performed on the serviced data message.

15. A method of performing a service on a multicast data message at a network edge between a source network and a destination network, the method comprising:

at a network edge forwarding element
analyzing a destination address of a received data message to determine that the destination address is a multicast destination address and that the received data message requires a particular service;
changing a destination media access control (MAC) address of the received data message from a multicast MAC address to a unicast MAC address associated with a service node that performs the particular service;
providing the data message to the service node to perform the service;
after receiving the serviced data message from the service node, changing the destination MAC address of the serviced data message to the multicast MAC address; and
forwarding the serviced data message to the destination network to reach multicast destinations of the data message,
wherein forwarding the serviced data message to the destination network comprises identifying a set of outgoing interfaces for the serviced data message,
wherein identifying the set of outgoing interfaces for the serviced data message comprises consulting an outgoing interfaces (OIF) list.

16. The method of claim 15, wherein the OIF list is based on a set of data messages received on the set of identified outgoing interfaces subscribing to the multicast group associated with the serviced data message.

17. A method of performing a service on a multicast data message at a network edge between a source network and a destination network, the method comprising:

at a network edge forwarding element:
analyzing a destination address of a received data message to determine that the destination address is a multicast destination address and that the received data message requires a particular service;
changing a destination media access control (MAC) address of the received data message from a multicast MAC address to a unicast MAC address associated with a service node that performs the particular service;
providing the data message to the service node to perform the service;
after receiving the serviced data message from the service node, changing the destination MAC address of the serviced data message to the multicast MAC address; and
forwarding the serviced data message to the destination network to reach multicast destinations of the data message,
wherein forwarding the serviced data message to the destination network comprises identifying a set of outgoing interfaces for the multicast data message,
wherein, for each interface in the set of identified outgoing interfaces, the forwarded data message sent out of the outgoing interface is modified such that (1) a source IP address is an IP address of the outgoing interface and (2) a source MAC address is a MAC address of the outgoing interface.

18. A method of performing a service on a multicast data message at a network edge between a source network and a destination network, the method comprising:

at a network edge forwarding element:
analyzing a destination address of a received data message to determine that the destination address is a multicast destination address and that the received data message requires a particular service;
changing a destination media access control (MAC) address of the received data message from a multicast MAC address to a unicast MAC address associated with a service node that performs the particular service;
providing the data message to the service node to perform the service;
after receiving the serviced data message from the service node, changing the destination MAC address of the serviced data message to the multicast MAC address; and forwarding the serviced data message to the destination network to reach the multicast destinations,
wherein the received data message is a first received data message associated with a first multicast destination internet protocol (IP) address, the method further comprising:
for a second data message received at the network edge with a second multicast destination IP address, determining that the data message does not require any service; and
based on the determination, forwarding the second data message to the destination network to reach multicast destinations of the second data message without changing a destination MAC address of the second data message.

* * * * *